(12) United States Patent
Takada

(10) Patent No.: US 7,031,402 B2
(45) Date of Patent: Apr. 18, 2006

(54) INTERFERENCE SIGNAL REMOVAL SYSTEM

(75) Inventor: Masatoshi Takada, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 748 days.

(21) Appl. No.: 10/101,072

(22) Filed: Mar. 20, 2002

(65) Prior Publication Data

US 2002/0196876 A1    Dec. 26, 2002

(30) Foreign Application Priority Data

Jun. 12, 2001    (JP)    ............................. 2001-177675

(51) Int. Cl.
*H04L 25/08*    (2006.01)

(52) U.S. Cl. .................... 375/296; 375/346; 375/347

(58) Field of Classification Search ................ 375/296, 375/346, 347, 342; 455/63
See application file for complete search history.

(56) References Cited

U.S. PATENT DOCUMENTS

| | | | |
|---|---|---|---|
| 5,533,012 A * | 7/1996 | Fukasawa et al. | 370/342 |
| 5,757,845 A * | 5/1998 | Fukawa et al. | 375/152 |
| 5,903,615 A * | 5/1999 | Thomson et al. | 375/346 |
| 6,219,376 B1 * | 4/2001 | Zhodzishsky et al. | 375/148 |
| 6,477,213 B1 * | 11/2002 | Miyoshi et al. | 375/347 |
| 6,791,995 B1 * | 9/2004 | Azenkot et al. | 370/436 |
| 2002/0071508 A1 * | 6/2002 | Takeda et al. | 375/346 |
| 2002/0155812 A1 * | 10/2002 | Takada | 455/63 |

FOREIGN PATENT DOCUMENTS

EP    0 982 861    3/2000

OTHER PUBLICATIONS

Patent Abstracts of Japan, entitled "*Receiver*", vol. 2000, No. 14, Mar. 5, 2001 & JP 2000 312167 A (Kokusai Electric Co. Ltd.), Nov. 8, 2000.

Glisic S, et al., "*Rejection of FH Signal in DS Spread Spectrum Systems Using Complex Adaptive Filters*", IEEE, Sep. 30, 1990, pp. 349-353.

Demirkiran I, et al., "*A Knowledge-Based Interference Rejection Scheme For Direct Sequence Spread-Spectrum Systems*", Personal Wireless Communications, 1997, IEEE International Conference on Mumbal, India Dec. 17-19, 1997, New York, NY, USA, IEEE, US, Dec. 17, 1997, pp. 120-124.

* cited by examiner

*Primary Examiner*—Stephen Chin
*Assistant Examiner*—Jaison Joseph
(74) *Attorney, Agent, or Firm*—Wenderoth, Lind & Ponack, L.L.P.

(57) ABSTRACT

An interference signal removal system includes interference signal estimating means for estimating an interference signal contained in a received signal based on the received signal and a result obtained by removing an interference signal from the received signal, interference signal removing means for removing from the received signal the interference signal estimated by the interference signal estimating means; and interference signal estimation controlling means for storing the interference signal estimation result of the interference signal estimating means in memory and controlling the interference signal estimation by the interference signal estimating means so as to estimate an interference signal contained in the received signal based on a past interference signal estimation result stored in memory.

20 Claims, 18 Drawing Sheets

INTERFERENCE SIGNAL REMOVAL SYSTEM

BACKGROUND OF THE INVENTION

1. Field of the Invention

This invention relates to an interference signal removal system for removing a narrow-band interference signal from a received signal that contains a narrow-band interference signal and a desired broadband signal and varies periodically in received power level, and particularly to such a system enabling efficient interference signal removal.

2. Description of the Prior Art

A signal received by a receiver may, for example, contain not only the signal to be received (desired signal) but also an accompanying signal that interferes with the desired signal (interference signal).

An explanation will be given regarding broadband desired signals and narrow-band interference signals, taking the wireless LAN (Local Area Network) of IEEE 802.11 as an example.

It should be noted that the meanings of the terms "broadband" and "narrow-band" are relative. Specifically, a signal whose exclusive bandwidth is considerably broad in comparison with the exclusive bandwidth of a narrow-band interference signal is called a "broadband signal." For example, a signal whose exclusive bandwidth is ten or more times greater than the exclusive bandwidth of a narrow-band interference signal is called a "broadband signal." In the case of the wireless LAN under discussion, the exclusive bandwidth of the broadband signal is, for instance, 26 MHz (frequency per wave) and the exclusive bandwidth of the narrow-band signal is, for instance, 2 MHz (frequency per wave).

The IEEE 802.11 wireless LAN is broadly divided into two system types: the DSSS (Direct Sequence Spread Spectrum) system and FHSS (Frequency Hopping Spread Spectrum) system. From the difference in their modulated waves, the signal according to DSSS can be viewed as a broadband signal and the signal according to FHSS can be viewed as a narrow-band signal. Since the two systems conduct wireless communication using the same frequency band and are allowed to interfere systematically, the signals naturally interfere with each other.

DSSS is a communications system that spectrum-spreads and transmits a narrow-band signal as a broadband signal and on the receive side restores the signal to the original narrow-band signal in a demodulation process. In DSSS, therefore, the narrow-band interference signal contained in the received signal can be suppressed by spreading it over the broadband signal in the demodulation process. The ratio between before and after spreading is called the "spreading rate." When the spreading rate is 128, for example, a gain of about 21 dB (10 LOG 128 to be exact) is obtained.

FHSS is a system that utilizes a broadband for communications by changing the transmit frequency of a narrow-band signal at regular time intervals. When the FHSS system is observed at a fixed time point, therefore, its exclusive bandwidth is narrow, i.e., 2 MHz, and the power of the DSSS of the band is relatively low. As a result, the effect of interference can be suppressed by a receive filter of a receiver utilizing the FHSS system.

In FHSS, interference between signals transmitted by different transmitters using different hopping patterns is unlikely to cause a problem because the probability of the same frequency being used at the same time is low. Moreover, FHSS can frequency hop over a broader band than the DSSS frequency band. Even when strong interference is experienced from DSSS, therefore, signal reception is still possible by using a frequency band where interference is not encountered.

With DSSS, however, the spreading rate may be lowered to increase the signal transfer speed. When the spreading rate is lowered to 11, for example, gain falls to about 10 dB (10 LOG 11 to be exact). When the spreading rate is lowered even more, gain falls still further. It may therefore become impossible to obtain an interference signal suppressing effect.

In addition, Bluetooth (short-range mobile service) and other standards that utilize FHSS are coming into wide use as wireless interfaces. The probability of DSSS signals encountering interference is therefore increasing.

Other instances in which interference may become a problem include interference occurring in adjacent frequency bands between W-CDMA (Wideband-Code Division Multiple Access) communication signals and PHS (Personal Hand phone System) communication signals, interference occurring between 2.4 GHz band wireless LAN (IEEE 802.11) broadband signals and Bluetooth narrow-band signals, interference occurring owing to frequency band sharing between CDMA communication signals and TDMA (Time Division Multiple Access) or FDMA (Frequency Division Multiple Access) communication signals, and interference caused by unpredictable extraneous waves.

Known techniques for removing such inference under consideration include a removal method using an adaptive algorithm and an interference signal removal method using a filter such as a notch filter. One example is the technique for removing narrow-band signals interfering with broadband signals with a notch filter using a multi-rate filter bank described in Application of Complex Multi-rate Filter Bank to a Frequency Band Sharing DS-CDMA/TDMA Signal Blanket Receiver (Electronics and Communications Engineering Journal B-II Vol. J80-BII No 12 December 1997).

An example of a conventional interference signal removal system will now be explained. The interference signal removal system is, for example, installed in a receiver for wireless communications and used to remove interference signals contained in signals received by the receiver.

As exemplified in FIG. 10, the interference signal removal system is equipped with an interference signal estimator 31, an interference signal extractor 32 and a synthesizer 33. The symbol t represents time.

A received signal r(t), which contains a desired broadband signal synthesized with multiple narrow-band interference signals, and a received signal e(t) after removal of interference are input to the interference signal estimator 31. The interference signal estimator 31 estimates interference signals contained in the received signal r(t) using an ordinary adaptive algorithm and outputs an interference signal estimation coefficient h(t+1) based on the estimation result to the interference signal extractor 32.

The received signal r(t) and the interference signal estimation coefficient h(t+1) are input to the interference signal extractor 32. The interference signal extractor 32 extracts a (presumed) interference signal V(t) from the received signal r(t) based on the interference signal estimation coefficient h(t+1) received from the interference signal estimator 31 and outputs the interference signal V(t) to the synthesizer 33.

The synthesizer 33 synthesizes the received signal r(t) and the interference signal V(t) from the interference signal extractor 32 in opposite phase (i.e., so that the interference signal V(t) is removed from the received signal r(t)) and outputs the received signal e(t) removed of the interference signal V(t). Part of the interference-reduced received signal e(t) output by the synthesizer 33 is sent to the interference signal estimator 31 and used for interference signal estimation.

CDMA and an interference signal removal system for CDMA will now be explained.

In a mobile communications system using DS-CDMA, for example, multiplex communication between multiple mobile stations and a base station is achieved by assigning different spreading codes to the individual mobile stations. Specifically, each mobile station uses the spreading code assigned to it to modulate (spread) the signal to be transmitted and the base station demodulates the signals from the individual desired mobile stations by using their assigned spreading codes to despread the received signals. Each mobile station uses its assigned spreading code to despread signals received from the base station and thereby demodulate the signals addressed to itself.

FIG. 11 shows an example of a spreading code sequence composed of, for example, a PN (pseudonoise signal) sequence.

As illustrated, one spreading code unit (for one symbol) is composed of chip data (e.g., a row of "1" values and "−1" values) and a plurality of different spreading codes are generated by varying the pattern of the row of chip data. A characteristic of the spreading codes is that when a given spreading code is shifted by one or more chip times, it loses its correlation with that spreading code.

The drawing indicates one chip data time width (chip interval Tc) and the spreading code time width for one symbol (bit interval T). The time width of the spreading code for one symbol corresponds to the time width of the transmission data (e.g., "1" values and "0" values) transmitted from a transmitter (e.g., a mobile station or a base station) to a receiver (e.g., a base station or a mobile station). In other words, the change rate of the chip data constituting the spreading code is very fast compared with the switching rate of the transmission data spread-modulated by the spreading code (the symbol switching rate).

As explained above, in this type of wireless communication, interference may occur within the broad frequency band whose frequencies are approved and used for communication, owing to unintentional mixing therewith of other (i.e., other than CDMA) narrow-band signals and the like. When the signals of this type exceed the level of interference by noise and the like envisioned at the time of system design, the number of bit errors increases and the quality of receiver reception is markedly degraded.

Another conceivable way to realize the foregoing purpose of efficient frequency band utilization is to achieve multiplex communication using a system like CDMA that communicates using a relatively broad frequency band together with a system like FM (frequency modulation) that communicates using a narrow-band. As a matter of operating principle, it is, for example, possible to achieve effective frequency band utilization by multiplexing an FM or other such analog communication signal with the frequency band of a CDMA spread signal. Unless the CDMA receiver can remove the FM signal etc. from the received signal, however, it and the spread signal will interfere with each other to increase the number of bit errors and degrade the reception quality.

FIG. 12 shows an example of the spectrum of a received signal containing a CDMA spread signal and an FM signal (FM interference wave), in which frequency is represented on the horizontal axis and spectral intensity on the vertical axis.

As an example of a conventional interference signal removal system (interference removal circuit), the one taught by published Japanese Patent Application No. 11-197296 will now be explained with reference to FIGS. 13 to 17. The interference signal removal system taught by this application is intended for use in a base station, mobile station or relay station utilizing CDMA to process a received signal containing a CDMA spread-modulated broadband signal and a narrow-band interference signal so as to remove the interference signal from the received signal or from the I component and Q component of the received signal, and is particularly adapted to utilize the characteristics of the spread signal for interference signal removal.

An example of the interference signal removal system configuration is shown in FIG. 13. The illustrated interference signal removal system processes an input received signal (received signal r(t)) containing a CDMA signal (desired signal) and an FM signal (interference signal) to remove the FM signal from the received signal r(t). In this interference signal removal system, removal of the interference signal from the received signal containing the CDMA signal (CDMA spread-modulated signal) and the interference signal is effected by imparting a time difference of one or more spreading code chip times between two signals into which the received signal is split by a time difference imparting means 41, sending the two signals to extraction means 42, 44 that extract a signal component having correlation between the two signals imparted with the time difference as an interference signal component, and sending the extracted interference signal component to a removal means 43 that uses it to remove the interference signal component from the received signal.

More specifically, the illustrated interference signal removal system comprises a delay device 41 for delaying the received signal, an adaptive filter 42 for extracting an interference signal component from the delayed received signal in accordance with a tap coefficient control signal from a filter tap coefficient arithmetic and control unit 44, a subtractor 43 for removing the interference signal component from the received signal, and the filter tap coefficient arithmetic and control unit 44 for outputting to the adaptive filter 42 the tap coefficient control signal based on the output signal from the subtractor 43 and the delayed received signal.

The configuration and operation of the illustrated circuit will now be explained.

The circuit is supplied with a signal r(t) received by a receiver. The received signal r(t) includes a spread signal, e.g. a CDMA spread-modulated signal, and a narrow-band communication signal constituting an interference signal (e.g., an FM-modulated signal). The symbol t represents time and, in the present case, is an integer discrete value representing the minimum unit of one sample time.

The input signal r(t) is first split into two signals, one of which is input to the delay device 41 and the other of which is input to the subtractor 43.

The delay device 41 functions to delay the input signal by one or more spreading code chip time widths. This time difference can be preset to a value that, for example, is sufficient to eliminate the spread signal correlation component between the two signals but allow the correlation component of the interference signal to be removed to remain.

Specifically, the signal output by the delay device 41 is represented by r(t−τ), where τ is the delay time imparted by the delay device 41.

The signal r(t−τ) output by the delay device 41 is sent to the adaptive filter 42 and the filter tap coefficient arithmetic and control unit 44.

An example of the configuration of the adaptive filter 42 is shown in FIG. 14.

The illustrated adaptive filter 42 comprises a shift register composed of (n−1) number of series-connected memory elements S1–Sn−1, n number of multipliers J1–Jn, and (n−1) number of adders K1–Kn−1, where n is the number of filter taps.

The successive signals r(t−τ) output by the delay device 41 are input to the shift register to be stored in the (n−1) number of memory elements S1–Sn−1 in time sequence. The signals stored in the (n−1) number of memory elements S1–Sn−1 are sequentially shifted to the following memory elements.

The sequence u(t) of the input signals r(t−τ) in the shift register is represented by Equation (1). The symbol u(t) represents a vector.

In this specification, all symbols used to represent signals and the like are scalar unless explicitly stated to be vectors or sequences.

$$u(t)=\{r1, r2, r3, \ldots, rn\}$$

$$rx=r(t-\tau-x+1) \quad \text{(Eq. 1)}$$

Signal r1 is a signal input to the shift register at a given time and output to the multiplier J1 without passing through any of the memory elements S1–Sn−1. Signals r2–rn are signals output from the memory elements S1–Sn−1 to the associated multipliers J2–Jn at their respective times.

In addition to being supplied with the associated signals r1–rn, the multipliers J1–Jn are also input with tap coefficient control signals h1–hn from the filter tap coefficient arithmetic and control unit 44 (explained later). The multipliers J1–Jn multiply the two input signals (i.e., weight the signals r1–rn with the tap coefficient control signals h1–hn) and output the multiplication results to adders K1–Kn−1.

The filter tap coefficient sequence h(t) output by the filter tap coefficient arithmetic and control unit 44 is represented by Equation 2, where h(t) is a vector.

$$h(t)=\{h1, h2, h3, \ldots, hn\} \quad \text{(Eq. 2)}$$

The multiplication results output by the multipliers J1–Jn are summed by the adders K1–Kn−1, and the summing result is output to the adaptive filter 42. As explained further below, the filter tap coefficient arithmetic and control unit 44 sequentially updates the filter tap coefficient sequence h(t) so that the summing result is made the same signal as the interference signal contained in the received signal.

Specifically, the signal FM(t) output by the adaptive filter 42 (i.e., the summing result) is represented by Equation 3, where Σ means sum.

$$FM(t)=h(t)*u(t)=\Sigma(hi*ri)(i=1, 2, \ldots, n) \quad \text{(Eq. 3)}$$

In this specification, the symbol "*" means that the terms positioned before and after the symbol "*" are multiplied. In the particular case where two vectors are multiplied, it means a computation for calculating the inner product of the two vectors.

As explained earlier, the adaptive filter 42 is responsive to the tap coefficient control signal from the filter tap coefficient arithmetic and control unit 44 for extracting the aforesaid interference signal from the input signal r(t−τ) and outputting it to the subtractor 43 as the extracted interference wave signal FM(t).

The subtractor 43 receives the undelayed input signal r(t) and the output signal FM(t) from the adaptive filter 42, subtracts the output signal FM(t) from the input signal r(t), and outputs a substraction result e(t).

The substraction result e(t), the output signal of this interference signal removal system, is represented by Equation (4).

$$e(t)=r(t)-FM(t) \quad \text{(Eq. 4)}$$

In this interference signal removal system, since the tap coefficient control signal from the filter tap coefficient arithmetic and control unit 44 (explained later) is sequentially updated, the extracted interference wave signal FM(t) is the same as the interference signal in the received signal. The substraction result e(t) is therefore the received signal removed of the interference signal, i.e., is the CDMA spread signal (ideally the spread signal only).

The filter tap coefficient arithmetic and control unit 44 receives the signal r(t−τ) output by the delay device 41 and the signal e(t) output by the subtractor 43, uses these signals to calculate a tap coefficient control signal that makes the signal FM(t) output by the adaptive filter 42 identical to the interference signal component, and outputs the calculated tap coefficient control signal to the adaptive filter 42.

The filter tap coefficient arithmetic and control unit 44 of the interference signal removal system uses an LMS (Least Mean Square), RLS (Recursive Least Square) or other such algorithm to calculate the tap coefficient control signal. Use of an LMS algorithm and an RLS algorthim will now be explained in the order mentioned.

The LMS general equation will be explained first.

The LMS update equation is expressed generally by Equation 5.

$$h(t+1)=h(t)+\mu*e(t)*u(t) \quad \text{(Eq. 5)}$$

Here, h(t) is the filter tap coefficient sequence at time t, and μ is a step size parameter (a coefficient related to convergence time and accuracy (weighting coefficient)), e(t) is the error signal at time t, and u(t) is the input signal sequence at time t.

The error signal e(t) is expressed generally by Equation 6.

$$e(t)=d(t)-u(t)*h(t) \quad \text{(Eq. 6)}$$

For d(t), which is what is known as an ordinary unique word or training signal, there is used a known signal defined beforehand on the transmit side and the receive side. In the computation algorithm using Equations 5 and 6, the error signal e(t) is converged on 0 by sequentially updating the filter tap coefficient sequence.

Application of the LMS algorithm to the foregoing interference signal removal system will now be explained.

When Equation 5 is applied to the interference signal removal system, h(t) is the filter tap coefficient sequence output from the filter tap coefficient arithmetic and control unit 44 to the adaptive filter 42, and u(t) is signal sequence output from the delay device 41 to the filter tap coefficient arithmetic and control unit 44 (represented by Equation 1).

The interference signal removal system uses the signal output by the subtractor 43 (represented by Equation 4) as the error signal e(t). This is a characterizing feature of this interference signal removal circuit, and the processing differs from that by the ordinary LMS algorithm.

First, assume that the delay device 41 is not provided. In this case, since the computation algorithm moves the error signal e(t) toward 0, the signal e(t) output by the subtractor 43 would converge on 0 so that a filter tap coefficient sequence h(t) would be generated that removes the received signal of not only the interference signal but also the CDMA spread signal.

Since the interference signal removal system is in fact equipped with the delay device 41, however, there is a time difference equal to the delay time τ between the signal r(t−τ) input to the filter tap coefficient arithmetic and control unit 44 from the delay device 41 and the signal e(t) input to the filter tap coefficient arithmetic and control unit 44 through the subtractor 43.

The CDMA spread signal r(t) and the spread signal r(t−τ) delayed one or more chip times relative thereto are uncorrelated signals. Therefore, when it is attempted to converge the error signal e(t) on 0 in accordance with the foregoing computation algorithm, error e(t) remains because the spread signal component of u(t) is uncorrelated with r(t). In other words, in Equation 4, since successive summing of the input signal sequence u(t) makes the effect of the interference signal component locally 0, the spread signal component is not removed but remains as error e(t). On the other hand, since the interference signal component, which varies more gradually than the chip data, has correlation even if delayed on the order of several chip times, a filter tap coefficient sequence h(t) enabling removal of only the interference signal component from the received signal can be generated.

In other words, when the aforesaid computation algorithm is applied to the interference signal removal system, the filter tap coefficient sequence h(t) can be generated so as to leave the correlated component of u(t) and e(t) (i.e., the interference signal component) in the signal output by the adaptive filter 42 but not to leave the uncorrelated portion (i.e., the spread signal component) in the signal output by the adaptive filter 42.

Such a computation algorithm enables the adaptive filter 42 of the interference signal removal system to extract and output to the subtractor 43 only the interference signal component of the received signal, so that the subtractor 43 can output a signal obtained by removing only the interference signal component from the received signal (i.e., the CDMA spread signal).

The interference signal removal system shown in FIG. 13 thus utilizes the characteristics of the spread signal to process a received signal containing a broadband spread signal produced by CDMA spread-modulation and a narrow-band interference signal so as to adaptively remove the interference signal. It therefore prevents degradation and enhances the quality of reception.

While FIG. 13 shows a configuration in which the signal output by the subtractor 43 is not delayed, the same effect as the foregoing can also be obtained by adopting instead a configuration that, as shown in FIG. 15, delays the received signal input to a subtractor 53 using a delay device 51 and does not delay the received signal input to a filter tap coefficient arithmetic and control unit 54. The configuration of FIG. 15 is substantially the same as that of FIG. 13 aside from the provision of the delay device 51 on the side of the subtractor 53.

It is also possible to obtain a similar interference removal effect using an algorithm other than the foregoing LMS algorithm. A specific example of an update type when using an RLS algorithm in the configuration of FIG. 13 will now be explained. For convenience of explanation, parameters corresponding to the foregoing u(t), h(t), e(t), d(t) and r(t) will be assigned the same reference symbols.

For example, an n-row by 1-column vector consisting of the same components as u(t) represented by Equation 1 is defined as input sequence u(t), and an n-row by 1-column vector that, like h(t) represented by Equation 2, consists of n-number of filter tap coefficients is defined as filter tap coefficient sequence h(t).

Further, corresponding to the error signal e(t) represented by Equation 6, there is defined the RLS error signal e(t) represented by Equation 7 below, in which $u^T(t)$ is u(t) transposed.

$$e(t)=d(t)-u^T(t)*h(t) \qquad (\text{Eq. 7})$$

In the present example, the received signal r(t) input to the subtractor 43 is used as d(t), and $u^T(t)*h(t)$ in Equation 7 corresponds to the extracted interference wave signal output by the adaptive filter 42. In other words, as in the case of using the aforesaid LMS algorithm, the signal output by the adaptive filter 42 is used as the error signal e(t) represented by Equation 7. This is a characterizing feature of the present example. Similarly to when the LMS algorithm is used, error signal e(t) converges on 0 when the delay device 41 is not provided.

Using, for example, a coefficient error correlation matrix P(t) that is an n-row by n-column matrix and a gain vector k(t) that is an n-row by 1-column matrix, the RLS update equations can be written as the following Equations 8 to 10.

$$h(t)=h(t-1)+k(t)*e(t) \qquad (\text{Eq. 8})$$

$$k(t)=\{P(t-1)*u(t)\}/\{1+u^T(t)*P(t-1)*u(t)\} \qquad (\text{Eq. 9})$$

$$P(t)=P(t-1)-k(t)*u^T(t)*P(t-1) \qquad (\text{Eq. 10})$$

As the initial value h(0) of the filter tap coefficient sequence h(t) is used, for example, the zero vector represented by Equation 11, and as the initial value P(0) of the coefficient error correlation matrix P(t) is used, for example, a matrix wherein, as shown in Equation 12, all diagonal elements whose row number and column number coincide are a positive real number c and all other elements are 0 is used. $h^T(0)$ is h(0) transposed. Further, I in Equation 12 is an n-row by n-column matrix wherein all diagonal elements whose row number and column number coincide are 1 and all other elements are 0.

$$h^T(0)=\{0, 0, 0, \ldots, 0\} \qquad (\text{Eq. 11})$$

$$P(0) = c*I = \begin{pmatrix} c & 0 & . & . & 0 \\ 0 & . & . & . & . \\ . & . & c & . & . \\ . & . & . & . & 0 \\ 0 & . & . & 0 & c \end{pmatrix} \qquad (\text{Eq. 12})$$

As a result of the filter tap coefficient arithmetic and control unit 44 sequentially updating the filter tap coefficient sequence h(t) in accordance with the RLS update equations shown above, the signal output by the adaptive filter 42 can be brought progressively closer to the actual interference signal component, similarly to when the LMS algorithm is used, whereby a received signal containing a CDMA spread-modulated broadband signal and a narrow-band interference signal can be removed of the interference signal.

FIG. 16 shows an interference signal removal system that is supplied with the I component and Q component of a received signal containing a CDMA signal (desired signal) and an FM signal (interference signal) and removes the FM signal from the I component rI(t) and the Q component rQ(t). In this interference signal removal system, removal of the interference signal from the I component and the Q component of the received signal containing the CDMA spread-modulated signal and the interference signal is effected by imparting a time difference of one or more spreading code chip times between two signals into which the I component is split and two signals into which the Q component is split by time difference imparting means 61a, 61b, sending a received signal composed of one I component and Q component imparted with the time difference and a received signal composed of the other I component and Q component imparted with the time difference to extraction means 62a, 62b, 63a, 63b that extract from a signal component having correlation between the two signals an I component and a Q component of the interference signal as an interference signal component, and sending the I component and the Q component of the extracted interference signal component to a removal means 64a, 64b, 65a and 65b that use them to remove the I component of the interference signal component from the received signal and the Q component of the interference signal component from the received signal.

More specifically, the illustrated interference signal removal system comprises a delay device 61a for delaying an I phase signal (I component) orthogonally detected from the received signal, a delay device 61b for delaying a Q phase signal (Q component) orthogonally detected from the received signal, four adaptive filters 62a, 62b, 63a, 63b for extracting interference signal components from the delayed I component and Q component in accordance with a tap coefficient control signal from a filter tap coefficient arithmetic and control unit 66 (explained later), an adder 64a for summing the I component of the interference signal component, adder 64b for summing the Q component of the interference signal component, a subtractor 65a for removing the I component of the interference signal component from the I component of the received signal, a subtractor 65b for removing the Q component of the interference signal component from the Q component of the received signal, and the filter tap coefficient arithmetic and control unit 66 for outputting to the adaptive filters 62a, 62b, 63a, 63b the tap coefficient control signal based on the output signals from the subtractors 65a, 65b and the I component and Q component of the delayed received signal.

The configuration and operation of the illustrated circuit will now be explained.

The circuit is supplied with an I component rI(t) and a Q component rQ(t) orthogonally detected from a signal received by a receiver. The received signals rI(t), rQ(t) include a broadband spread signal, e.g. a CDMA spread-modulated signal, and a narrow-band communication signal constituting an interference signal (e.g., an FM-modulated signal). Similarly to what was explained earlier with reference to FIG. 13, the symbol t represents time and, in the present case, is an integer discrete value representing the minimum unit of one sample time.

The I component rI(t) is first split into two signals, one of which is input to the delay device 61a and the other of which is input to the subtractor 65a. Similarly, the Q component rQ(t) is first split into two signals, one of which is input to the delay device 61b and the other of which is input to the subtractor 65b.

Similarly to the delay device 41 shown in FIG. 13, the delay devices 61a, 61b function to delay the input signals by one or more spreading code chip time widths. Both delay devices 61a, 61b impart the same delay time. Similarly to what was explained with reference to FIG. 13, the I component signal output by the delay device 61a is represented by rI(t−τ) and the Q component signal output by the delay device 61b is represented by rQ(t−τ), where τ is the delay time imparted by the delay devices 61a, 61b.

The signal rI(t−τ) output by the delay device 61a is sent to the two adaptive filters 62a, 63a and the filter tap coefficient arithmetic and control unit 66. The signal rQ(t−τ) output by the delay device 61b is sent to the two adaptive filters 62b, 63b and the filter tap coefficient arithmetic and control unit 66.

The adaptive filters 62a, 62b, 63a, 63b can be of the same configuration as explained earlier with reference to FIG. 14. Four adaptive filters 62a, 62b, 63a, 63b are provided for carrying out the I-phase and Q-phase complex computations because the I component and the Q component of the interference signal component are contained in both the I component and the Q component of the received signal. Further, in this example, two types of filter tap coefficient sequences are used: an I-phase filter tap coefficient sequence hI(t) and a Q-phase filter tap coefficient sequence hQ(t). hI(t) and hQ(t) are vectors.

In this example, the filter tap coefficient arithmetic and control unit 66 (explained later) generates filter tap coefficient sequences hI(t), hQ(t) that enable the adaptive filter 62a to extract the I component of the interference signal component from the I component rI(t−τ) of the input received signal, the adaptive filter 63a to extract the Q component of the interference signal component from the I component rI(t−τ) of the input received signal, the adaptive filter 62b to extract the Q component of the interference signal component from the Q component rQ(t−τ) of the input received signal, and the adaptive filter 63b to extract the I component of the interference signal component from the Q component rQ(t−τ) of the input received signal.

The adder 64a sums the signals output by the adaptive filters 62a, 63b and outputs the result to the subtractor 65a. The summing result output to the subtractor 65a is the interference signal component of the I component of the received signal (i.e., the I component of the interference signal) FMI(t). In the present example, the adder 64a reverses the sign of the signal output by one adaptive filter (adaptive filter 63b) when carrying out the addition. If sign reversal is conducted by, for example, the adaptive filter 63b or the filter tap coefficient arithmetic and control unit 66 (explained later), however, the aforesaid sign reversal at the adaptive filter 62a is unnecessary.

The adder 64b sums the signals output by the adaptive filters 62b, 63a and outputs the result to the subtractor 65b. The summing result output to the subtractor 65b is the interference signal component of the Q component of the received signal (i.e., the Q component of the interference signal) FMQ(t).

The I component FMI(t) of the interference signal component output by the adder 64a is represented by Equation 13 and the Q component FMQ(t) of the interference signal component output by the adder 64b is represented by Equation 14. uI(t) and uQ(t) in Equations 13 and 14 are vectors and correspond to the I component and Q component of u(t) represented by Equation 1 in the explanation made earlier with reference to FIG. 13.

$$FMI(t)=\{hI(t)*uI(t)\}+\{-hQ(t)*uQ(t)\} \quad \text{(Eq. 13)}$$

$$FMQ(t)=\{hI(t)*uQ(t)\}+\{hQ(t)*uI(t)\} \quad \text{(Eq. 14)}$$

The subtractor 65a receives the undelayed I-component input signal rI(t) and the output signal FMI(t) from the adder 64a, subtracts the output signal FMI(t) from the input signal rI(t), and outputs a substraction result eI(t).

Similarly, the subtractor 65b receives the undelayed Q-component input signal rQ(t) and the output signal FMQ(t) from the adder 64b, subtracts the output signal FMQ(t) from the input signal rQ(t), and outputs a substraction result eQ(t).

The substraction results eI(t), eQ(t) are the output signals of this interference signal removal system.

In this interference signal removal system, since the tap coefficient control signal from the filter tap coefficient arithmetic and control unit 66 (explained later) is sequentially updated, the extracted I-component and Q-component interference wave signals FMI(t), FMQ(t) are the same as the I-component and Q-component interference signals in the received signal. The substraction results eI(t), eQ(t) are therefore the received signal from whose I component and Q component the interference signal has been removed, i.e., is the CDMA spread signal (ideally the spread signal only).

The filter tap coefficient arithmetic and control unit 66 receives the signals rI(t−τ), rQ(t−τ) output by the two delay devices 61a, 61b and the signals eI(t), eQ(t) output by the two subtractors 65a, 65b, uses these signals to calculate tap coefficient control signals that make the signals output by the adaptive filters 62a, 62b, 63a, 63b identical to the interference signal components, and outputs the calculated tap coefficient control signal to the adaptive filters 62a, 62b, 63a, 63b. In the present example, the two adaptive filters 62a, 62b output identical tap coefficient control signals, and the other two adaptive filters 63a, 63b output identical tap coefficient control signals, thereby setting them so as to generate the interference signal component FMI(t), FMQ(t) represented by Equations 13 and 14.

The filter tap coefficient arithmetic and control unit 66 of the interference signal removal system calculates the tap coefficient control signals using an algorithm for complex LMS algorithm such as explained with reference to FIG. 13. The LMS update equations of this algorithm are expressed by Equations 15 and 16.

$$hI(t+1)=hI(t)+\mu^*(eI(t)^*uI(t)+eQ(t)^*uQ(t)) \qquad \text{(Eq. 15)}$$

$$hQ(t+1)=hQ(t)+\mu^*(eQ(t)^*uI(t)+eI(t)^*uQ(t)) \qquad \text{(Eq. 16)}$$

Here, hI(t) and hQ(t) are the filter tap coefficient sequences at time t, and μ is a step size parameter (a coefficient related to convergence time and accuracy) and uI(t), uQ(t) are input signal sequences in the shift registers of the adaptive filters 62a, 63a and the shift registers of the adaptive filters 62b, 63b, respectively. Similarly to what was explained with reference to FIG. 13, moreover, as eI(t), eQ(t) there are used the signals output by the subtractor 65a and the subtractor 65b, respectively. As stated earlier, uI(t) and uQ(t) are vectors.

Similarly to what was explained with respect to FIG. 13, since in this interference signal removal system the computation algorithm sequentially updates the filter tap coefficient sequences hI(t), hQ(t), filter tap coefficient sequences hI(t), hQ(t) can be generated that are capable of removing the interference signal components, which have relatively strong correlation, without removing the spread signal component, which has uncorrelation.

Since the filter tap coefficient sequences hI(t), hQ(t) are calculated taking both the I component and the Q component into account, moreover, the accuracy of the interference removal is improved.

The interference signal removal system shown in FIG. 16 thus utilizes the characteristics of the spread signal to process a received signal containing a broadband spread signal produced by CDMA spread-modulation and a narrow-band interference signal so as to remove the interference signal from the I component and Q component thereof. It therefore prevents degradation and enhances the quality of reception.

While FIG. 16, like FIG. 13 referred to earlier, shows a configuration in which the signals output by the subtractors 65a, 65b are not delayed, the same effect as the foregoing can also be obtained by instead adopting a configuration that, as shown in FIG. 17, delays the received signal input to subtractors 75a, 75b using delay devices 71a, 71b and does not delay the received signal input to adaptive filters 72a, 72b, 73a, 73b and a filter tap coefficient arithmetic and control unit 76. The configuration of FIG. 17 is substantially the same as that of FIG. 16 aside from the provision of the delay devices 71a, 71b on the side of the subtractors 74a, 74b in addition to the constituents set out in the foregoing.

Also similarly to what was explained with reference to FIG. 13, it is possible to obtain a similar interference removal effect using an algorithm other than the foregoing LMS algorithm. An example using an RLS algorithm for complex computation in the configuration of FIG. 16 will now be explained. For convenience of explanation, parameters corresponding to the foregoing uI(t), uQ(t), hI(t), hQ(t), eI(t), eQ(t), rI(t) and rQ(t) will be assigned the same reference symbols.

In the RLS algorithm for complex computation, u(t), h(t), e(t), k(t), P(t) and all other parameters indicated in Equations 7 to 10 consist of complex number terms. Defining γ and ω as real numbers and using j as the symbol for the imaginary part, an arbitrary complex number term is represented as (γ+jω).

With the RLS algorithm for complex computation, sequential update processing like that explained with reference to FIG. 13 can be realized in complex computation by separating the real number part and the imaginary number part and using them as the I-component parameter and the Q-component parameter, respectively.

Specifically, in the case of the present example, the real number part of u(t) is defined as uI(t), the imaginary number part thereof as uQ(t), the real number part of h(t) is defined as hI(t) and the imaginary number part thereof as hQ(t), the real number part of eI(t) is defined as eI(t) and the imaginary number part thereof as eQ(t), and so forth, and processing is conducted for removing the interference signal components from the I component rI(t) and Q component rQ(t) of the received signal.

Thus, similarly to when an LMS algorithm for complex computation is used, use of an RLS algorithm for complex computation in the foregoing manner also enables removal of the interference signal from the I component and the Q component of a received signal containing a CDMA spread-modulated broadband signal and a narrow-band interference signal.

An explanation will now be given regarding how the conventional interference signal removal system such as that shown in FIG. 10 processes a received signal to remove a periodic TDMA signal received as interference signal.

FIG. 18(a) shows an example of the time course of the received power of a received signal when a periodic TDMA signal is superimposed as an interference signal on a broadband signal such as a CDMA signal received as the desired signal. In the drawing, time (t) is represented on the horizontal axis and received power on the vertical axis. FIG. 18(a) shows an example in which interference signal power that varies periodically, i.e., repeatedly appears every regular interval T, is superimposed on broadband signal power that is substantial constant over time. From FIG. 18(a) it can be seen that when a periodic TDMA signal is received as interference, the received power of the received signal varies dependently thereon at the same period T. FIG. 18(a) shows a case in which interference signal power of two magnitudes is superimposed on the broadband signal power.

Moreover, interference from TDMA signals is not necessarily limited to a single frequency and may be received at multiple frequencies.

FIG. 18(b) shows an example of the time course of received signal frequency components when a broadband desired signal receives interference from TDMA signals in two different frequency bands. The horizontal axis of the chart represents time (t) and the vertical axis frequency. On the horizontal axis representing time elapse, the time T of each period is divided into 8 unit time periods T1–T8 of equal time width ΔT.

More specifically, FIG. 18(b) shows an example in which a TDMA signal of frequency f3 that repeatedly appears every time period T1 and a TDMA signal of frequency f2 that repeatedly appears every time period T4 and time period T8 interfere with a broadband signal spanning frequency f1 to frequency f4 (f1>f2>f3>f4). The places where interference occurs are colored black. The interference signals usually have a bandwidth. The expressions "interference signal of frequency f3" and "interference signal of frequency f2" are therefore used to specify the interference signals by their center frequencies f3 and f2.

In order for a conventional adaptive filter type interference signal removal system such as shown in FIG. 10 to deal with interference signals that exhibit the intense power change of a TDMA signal, the update rate of the control coefficient h(t+1) used for interference signal estimation and extraction must be accelerated during the interference signal estimation conducted by the sequential update processing of the interference signal estimator 31.

FIG. 18(c) shows an example of the time course of the power of the interference-reduced received signal obtained by removing the TDMA signal (the interference signal) from the received signal shown in FIG. 18(a) using a conventional interference signal removal system operated at an accelerated control coefficient h(t+1). The horizontal axis of the chart represents time (t) and the vertical axis represents received signal power after interference signal removal. For convenience of explanation, FIG. 18(c) shows power of the received signal after removal of the interference signals by a solid curve and the interference signal before interference signal removal by a dotted curve.

FIG. 18(d) shows an example of the time course of the frequency components of the interference-reduced received signal obtained by removing the TDMA signals (the interference signals) from the received signal shown in FIG. 18(b) using a conventional interference signal removal system operated at an accelerated control coefficient h(t+1). The horizontal axis of the chart represents time (t) and the vertical axis frequency. Places where interference signal components remain are represented in shades of gray. The shading approaches white with decreasing amount of remaining interference signal after interference removal.

As shown in FIGS. 18(c) and 18(d), in the case of interference signals that vary intensely like TDMA signals, the conventional interference signal removal system cannot, merely by speeding up the update rate of the control coefficient h(t+1), thoroughly remove interference signals, because sufficient time for interference signal estimation cannot be obtained at the beginning of interference signal reception. Moreover, a configuration that updates the control coefficient h(t+1) for interference signal estimation and extraction at high speed is not practical from the aspect of system feasibility. Although a method that does not sequentially update the control coefficient h(t+1) and operates the filter using a constant control coefficient h(t+1) even when no interference signal is present is conceivable, this method is disadvantageous because the effect of the interference signals on the received signal increases and reception quality degenerates when interference is received in multiple frequency bands.

Some conventional techniques for interference signal removal will now be set out for reference purposes.

In the "Method and device for conducting simultaneous broadband and narrow-band communication" taught by Patent Kohyo (Japanese National Publication of Translated Version) No. 9-507734 a high-intensity signal component of a communication signal is detected by FFT (Fast Fourier Transformation), the detected signal component is removed from the received signal by a frequency notch filter, and the received signal after the removal is subjected to iFFT (inverse FFT).

In the "Interference wave cancellation device" taught by Japanese Unexamined Patent Publication No. 2000-174645, an interference wave cancellation signal is generated by wave-filtering a received signal with a narrow-band BPF (Band Pass Filter) exhibiting a substantially flat phase characteristic in a specific frequency band of significant width.

In the "Narrow-band interference wave restricting device and communication using the same" taught by Japanese Unexamined Patent Publication No. 2000-196497, an interference wave is restricted by using a frequency-selective level restricting circuit (e.g., a magnetostatic wave filter) to restrict the output level of a variable amplification factor amplifier, the power of a spread signal output by the frequency-selective level restricting circuit is detected by a power detector, and variable amplification factor is controlled to make the detected value constant.

In the "Noise removal device and noise removal method in code division multiple access communications" taught by Japanese Unexamined Patent Publication No. 2000-307468, a jamming wave carrier frequency including a jamming wave signal is detected from a received signal using a pair of receiver units and a jamming wave discriminating unit and the detected jamming wave carrier wave signal is removed from the received signal using a filter unit.

As is clear from the foregoing discussion of the prior art, conventional interference signal removal systems cannot achieve sufficient interference signal removal accuracy when removing interference signals that vary intensely like TDMA signals. Moreover, conventional interference signal removal systems have not given adequate attention to techniques for efficient removal of interference signals that appear repeatedly in the manner of TDMA signals.

This invention was accomplished in light of these circumstances and has as an object to provide an interference signal removal system that enables efficient interference signal removal in cases where, for example, an interference signal superimposed on a desired signal and periodically varying in received power level is removed from the received signal. Another object of the invention is to provide an interference signal removal system that enables accurate interference signal removal even in a case of removing from a received signal a TDMA signal or other such intensely varying signal.

SUMMARY OF THE INVENTION

The present invention achieves these objects by providing an interference signal removal system for removing from a received signal an interference signal that appears repeatedly with passage of time, which system is characterized in that it estimates an interference signal contained in a received signal based on a past interference signal estimation result and removes the estimated interference signal from the received signal.

Since the interference signal contained in the received signal is estimated based on the result of past interference signal estimation and then removed, efficient interference signal removal can be realized from such aspects as interference signal estimation accuracy and processing speed.

The interference signal that appears repeatedly with passage of time to which the invention system applies is, for example, the interference signal in a situation where an interference signal identical or similar to an interference signal that appeared in the past reappears in the received signal and the time of the reappearance of the identical or similar interference signal in the received signal is predictable. By an interference signal similar to an interference signal that appeared in the past is meant a signal that is similar enough in signal level, signal waveform or the like to be considered an identical signal for the purpose of removal.

If the interference signal is periodic, a method that predicts the time of interference signal appearance based on the period can be used. If the interference signal is not periodic but its appearance is preceded by a precursor such as a signal of a specific signal waveform or another specific interference signal, a method that predicts the time of interference signal appearance based on the precursor can be adopted.

In the present invention, the interference signal that appears repeatedly with passage of time encompasses an interference signal that is repeatedly emitted from the same source. It also encompasses an interference signal that is emitted from the same source and varies in received power level or the like owing to the distance or wireless propagation condition between the source and the communication system incorporating the interference signal removal system according to the present invention.

The interference signal that appears repeatedly with passage of time may be an interference signal that appears repeatedly at discrete time points. For instance, when a signal is continuous over time but its signal level varies periodically, a series of signal portions extracted from the signal at time points when the signal level is the same or approximately the same can be considered to be an interference signal that appears repeatedly with passage of time.

Thus, in the case where an interference signal or the like that is identical or similar to an interference signal contained in a previously received signal reappears in the received signal, this invention achieves efficient interference signal removal by estimating the identical or similar interference signal based on the past interference signal estimation result. Any interference signal that can be dealt with in this manner can be considered an interference signal that appears repeatedly with passage of time for the purposes of the present invention.

The present invention encompasses processing of a received signal containing a desired signal and an interference signal for removing the interference signal not only by the interference signal removal processing mode in which these signals are treated as real number parts as was discussed earlier with reference to FIGS. 13 and 15 but by the interference signal removal processing mode in which these signals are divided into their I components and Q components as discussed earlier with reference to FIGS. 16 and 17.

The number of interference signals contained in the received signal can be only a single signal or multiple signals.

As the past interference signal estimation result there can be used the interference signal estimation results obtained one time earlier or the interference signal estimation result obtained two or more times earlier. Otherwise, there can be used a plurality of past interference signal estimation results or the average of a plurality of past interference signal estimation results.

The method used to estimate an interference signal contained in a received signal can be one that estimates information regarding the interference signal itself, such as the signal level of the interference signal, one that estimates information for determining the interference signal, such as a parameter to be substituted into an arithmetic expression for determining the interference signal, one that uses sequential updating based on an LMS algorithm, an RLS algorithm or the like as explained earlier with regard to the prior art, or one that uses a prescribed arithmetic expression to calculate an estimated value of the interference signal by one or more computations.

Any of various methods can be used to estimate an interference signal contained in a received signal based on a past interference signal estimation result. For example, it is possible to use a method that utilizes a past interference signal estimation result as an assumed initial estimation result in the current interference signal estimation processing or one that uses past interference signal estimation results to assess a tendency of the interference signal, such as a level increase tendency or level decrease tendency, and estimates the current interference signal based on the result of the assessment.

Although the accuracy of removal of the interference signal from the received signal is preferably such that the interference signal contained in the received signal is totally removed, various degrees of accuracy are acceptable insofar as the interference signal is removed from the received signal to an extent that is practically effective.

The present invention encompasses configurations that prevent removal from the received signal of not only the interference signal but also even the desired signal. Such configurations include, for example, one that estimates interference signals whose levels have been suppressed, one that removes from the received signal interference signals whose levels have been suppressed with respect to estimated interference signals, and one that removes from the received signal only interference signals of at least a prescribed level among the estimated interference signals.

In one configuration of the interference signal removal system according the present invention, interference signal estimating means estimates an interference signal contained in a received signal based on the received signal and a result obtained by removing an interference signal from the received signal, interference signal removing means removes from the received signal the interference signal estimated by the interference signal estimating means, and interference signal estimation controlling means simultaneously stores the interference signal estimation result of the interference signal estimating means in memory and controls the interference signal estimation by the interference signal estimating means so as to estimate an interference signal contained in the received signal based on a past interference signal estimation result stored in memory, thereby removing the interference signal from the received signal.

The method of estimating the interference signal contained in the received signal based on the received signal and the result obtained by removing an interference signal from the received signal can be one that uses sequential updating based on an LMS algorithm, an RLS algorithm or the like as explained earlier with regard to the prior art.

The interference signal estimation controlling means can include a memory and store the past interference signal estimation result in the memory.

The interference signal estimation results stored in memory by the interference signal estimation controlling means are not required to include all past interference signal estimation results and it suffices to store only the past interference signal estimation results to be used in future interference signal estimation processing. Specifically, the stored information estimation results can, for example, be the interference signal estimation result one time earlier, the interference signal estimation results obtained two or more times earlier, or a plurality of past interference signal estimation results or the average of a plurality of past interference signal estimation results.

In another configuration of the interference signal removal system according the present invention, the interference signal estimating means estimates an interference signal contained in a received signal by sequentially updating a control coefficient for extracting an interference signal from the received signal based on the received signal and a result obtained by removing an interference signal from the received signal, the interference signal removing means has interference signal extracting means that extracts the interference signal from the received signal using the control coefficient sequentially updated by the interference signal estimating means, and removes the interference signal extracted by the interference signal extracting means from the received signal, and the interference signal estimation controlling means stores the sequentially updated control coefficient result value as an interference signal estimation result of the interference signal estimating means and controls the interference signal estimation by the interference signal estimating means so as to sequentially update the control coefficient for extracting the interference signal from the received signal using a past sequentially updated control coefficient result value stored in memory as an initial value.

In this configuration, the sequential updating of the control coefficient for estimating an interference signal that appears repeatedly with passage of time is started by using a past sequentially updated result value as the initial value of the control coefficient at the start of the sequentially updating and, therefore, a control coefficient that achieves accurate interference signal removal can be used even near the beginning of the sequentially updating. As a result, accurate interference signal removal can be achieved even near the start of the sequentially updating. This configuration uses a sequentially updated control coefficient result value related to a past interference signal as the initial value of the control coefficient for extracting the interference signal to be removed. After the initial value has been set, however, the processing for sequentially updating the control coefficient is conducted based on the interference signal to be removed.

The control coefficient for extracting the interference signal from the received signal can, for example, be the control coefficient $h(t+1)$ of an LMS algorithm or RLS algorithm explained earlier with regard to the prior art.

Any of various update equations can be used for sequentially updating the control coefficient. For example, it is possible to use an LMS algorithm or RLS algorithm update equation such as explained earlier with regard to the prior art.

The method used to extract the interference signal from the received signal using the control coefficient sequentially updated by the interference signal estimating means can be a method in an LMS algorithm or RLS algorithm as explained earlier with regard to the prior art.

The sequentially updated control coefficient result value is the final value of the control coefficient obtained as the final sequential updating result when the control coefficient for extracting a past interference signal was sequentially updated.

In another configuration of the interference signal removal system according the present invention, the interference signal estimation controlling means has a memory for storing the interference signal estimation result of the interference signal estimating means, and a timing controlling means controls the timing of storing interference signal estimation results of the interference signal estimating means in the memory and the timing of outputting past interference signal estimation results stored in the memory to the interference signal estimating means, thereby controlling the interference signal estimation by the interference signal estimating means.

The timing controlling means may be configured to control the input/output timing of the interference signal estimation result stored in the memory by, for example, storing the interference signal estimation result in the memory at the time of completion of each interference signal estimation processing cycle and outputting a required past interference signal estimation result from the memory to the interference signal estimating means at the time of starting each interference signal estimation processing cycle.

When the interference signal that appears repeatedly with passage of time is an interference signal that appears periodically, the interference signal removal system according to the present invention removes the interference signal from the received signal in the following manner.

The interference signal estimation controlling means updates the stored interference signal estimation result of the interference signal estimating means during the period concerned and controls the interference signal estimation of the interference signal estimating means so as to estimate the interference signal contained in the received signal based on the interference signal estimation result for one period earlier stored in memory.

With this configuration, in the case of processing a received signal containing a narrow-band interference signal whose received power level varies periodically, e.g., a TDMA signal, and a desired broadband signal so as to remove the narrow-band interference signal from the received signal, the interference signal estimation result is stored in memory at each period of the interference signal and the interference signal of each period is estimated based on the interference signal estimation result one period earlier. Accurate interference signal removal can therefore be achieved.

The periodically appearing interference signal can be any of various types. For example, it can be a TDMA signal or an FHSS signal.

The period of the interference signal is not particularly limited. Any of various periods are possible.

When multiple interference signals are present, the periods of the interference signals can differ. When interference signals with different periods are contained in the received signal, interference signal estimation control matched to the respective interference signals can be conducted.

In another configuration of the interference signal removal system according the present invention, the interference signal estimation controlling means stores the interference signal estimation result of the interference signal estimating means in the memory once every prescribed unit time period and controls the interference signal estimation by the interference signal estimating means so as to estimate the interference signal contained in the received signal based on the interference signal estimation result for one cycle earlier stored in memory every prescribed unit time period, thereby removing the interference signal from the received signal.

With this configuration, effective interference signal removal can be achieved over the whole of an elapsed continuous time period by storing an interference signal estimation result in the memory once every unit time period of a plurality of unit time periods into which the continuous time period is divided and conducting interference signal estimation processing based on interference signal estimation results stored in the memory in the past.

Either a configuration in which the prescribed unit time periods are all of the same length or a configuration in which the prescribed unit time periods are of different lengths can be adopted.

When the received signal contains of an interference signal having a single period, there can be used unit time periods formed by dividing the time of the period into a plurality of equal parts. When the received signal contains interference signals having two or more periods, there can be used for the two or more periods a common unit time period which enables the time of each period to be divided into a plurality of equal parts.

In another configuration of the interference signal removal system according the present invention, the interference signal estimation controlling means uses a period based on power variation of the received signal as the interference signal period.

In this configuration, when the period of the interference signal is not preset, a period based on the power variation of the received signal can be taken as the interference signal period and interference signal removal be conducted based on this period.

In this configuration, the power variation of the received signal is assumed to depend on the power variation of the interference signal contained in the received signal.

Further, the interference signal estimation controlling means in this configuration includes power detection means for detecting the power of the received signal.

In another configuration of the interference signal removal system according to the present invention, the interference signal estimation controlling means uses a period based on power variation of a signal of a prescribed frequency contained in the received signal as the period of the interference signal.

In this configuration, when the period of the interference signal is not preset, a period based on the power variation of a signal of prescribed frequency contained in the received signal can taken as the interference signal period and interference signal removal be conducted based on this period.

In this configuration, the power variation of the signal of prescribed frequency contained the received signal is assumed to depend on the power variation of the interference signal contained in the received signal.

Further, the interference signal estimation controlling means in this configuration includes prescribed frequency power detection means for detecting the power of the signal of prescribed frequency contained in the received signal.

The signal of prescribed frequency contained in the received signal can be a TDMA or FHSS control signal. Such a signal is periodic. The period of a TDMA signal or an FHSS signal constituting an interference signal can be ascertained from the period of such a control signal.

The interference signal removal system according to this invention is suitable for installation in the base station of a mobile communications system such as a mobile telephone system or PHS (Personal Hand phone System).

A base station according to the present invention is equipped with the interference signal removal system according to the present invention described in the foregoing and uses the interference signal removal system to remove interference signals contained in signals wirelessly received from the mobile stations with which it communicates. As a result, the base station can perform high quality processing of desired signals received from the mobile stations.

DESCRIPTION OF THE PREFERRED EMBODIMENTS

An embodiment of the present invention will now be explained with reference to the drawings.

Figure 1:
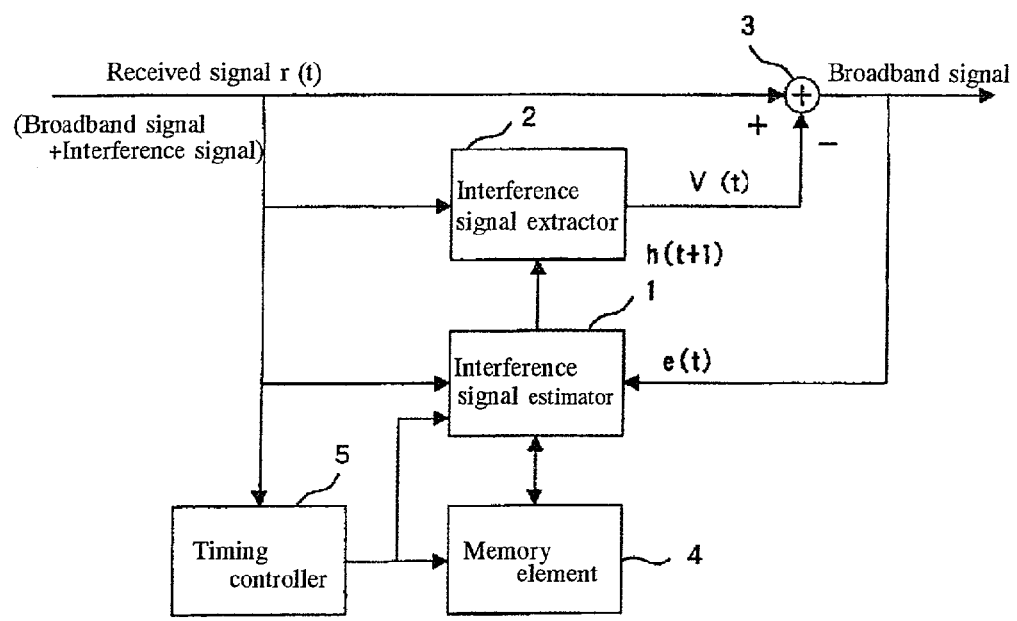
FIG. 1 is a diagram showing an interference signal removal system according to the present invention.
Figure 10:
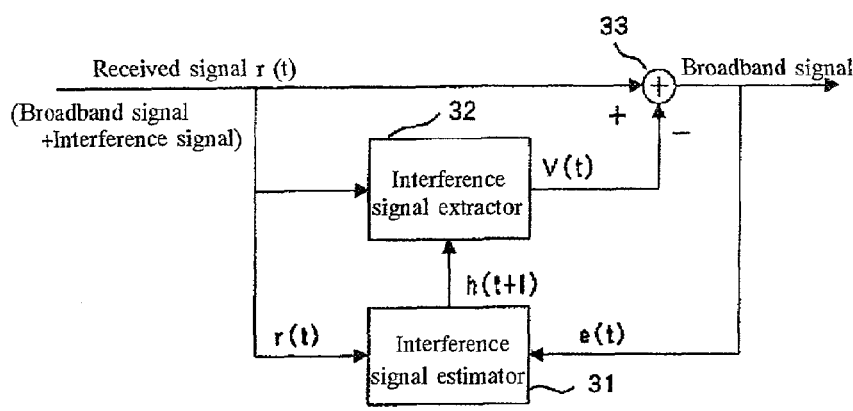
FIG. 10 is a diagram showing a conventional interference signal removal system.
Figure 11:
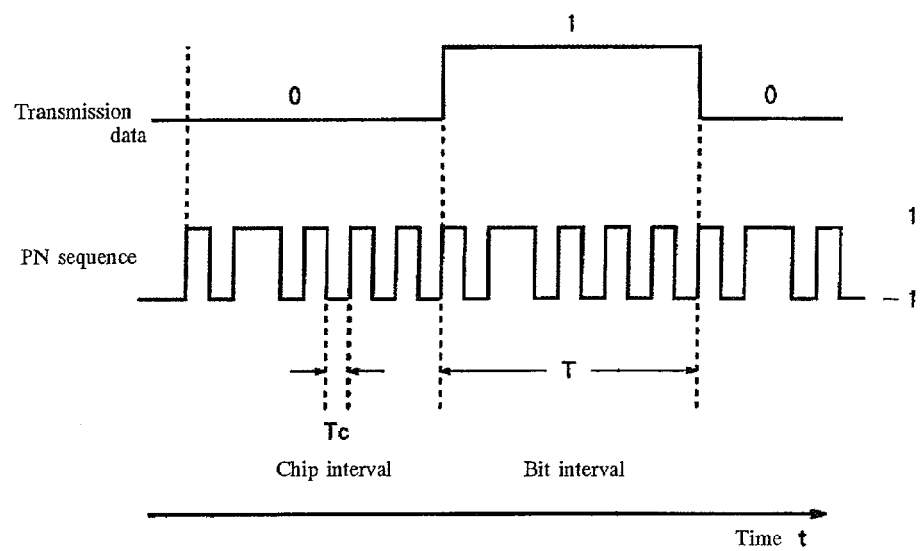
FIG. 11 is diagram for explaining a spreading code sequence.
Figure 12:
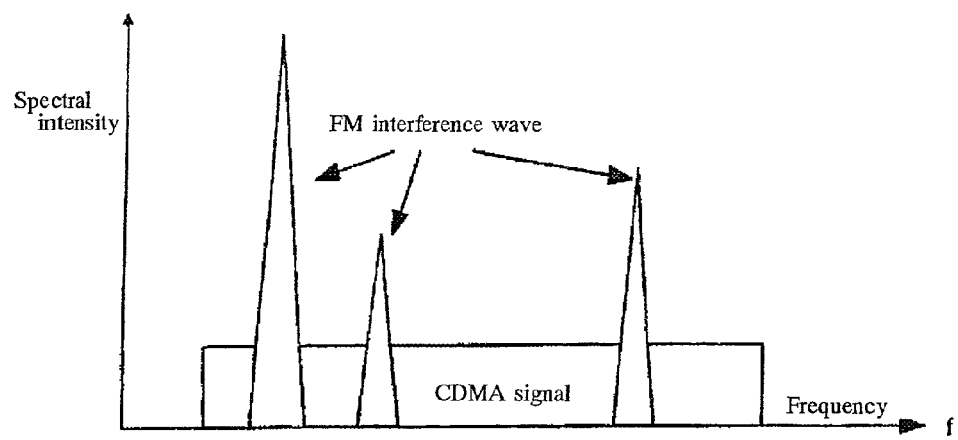
FIG. 12 is a diagram showing the spectrum of a received signal containing a CDMA broadband spread signal and a narrow-band interference signal.
Figure 13:
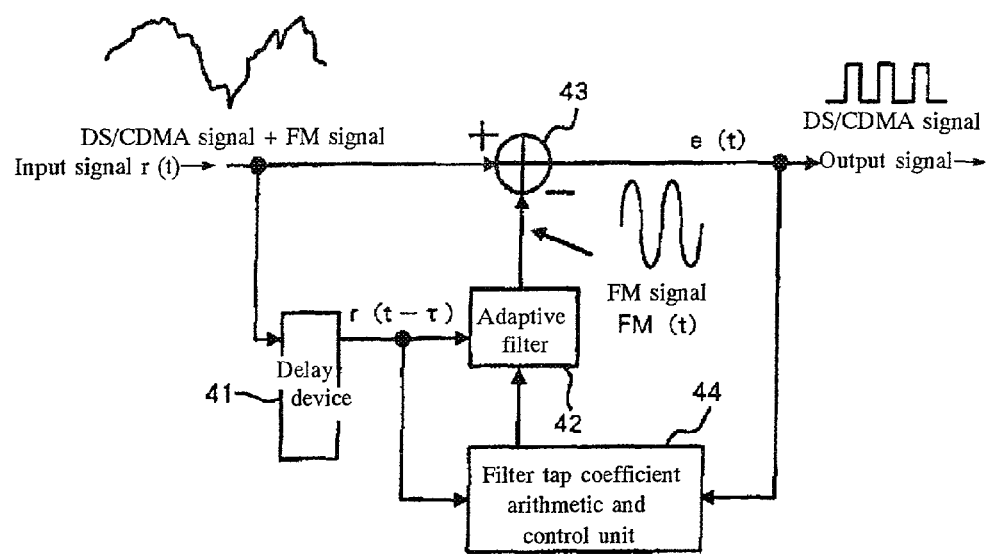
FIG. 13 is a diagram showing an interference signal removal system.
Figure 14:
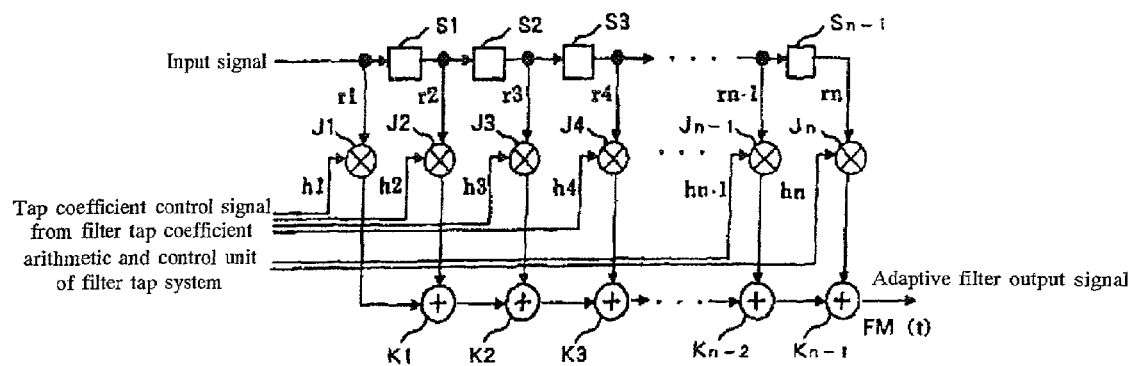
FIG. 14 is a diagram showing an adaptive filter.
Figure 15:
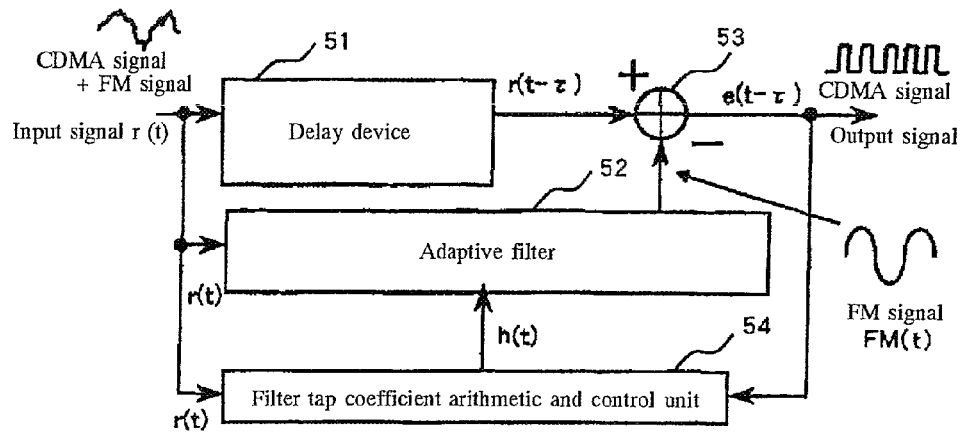
FIG. 15 is a diagram showing an interference signal removal system.
Figure 16:
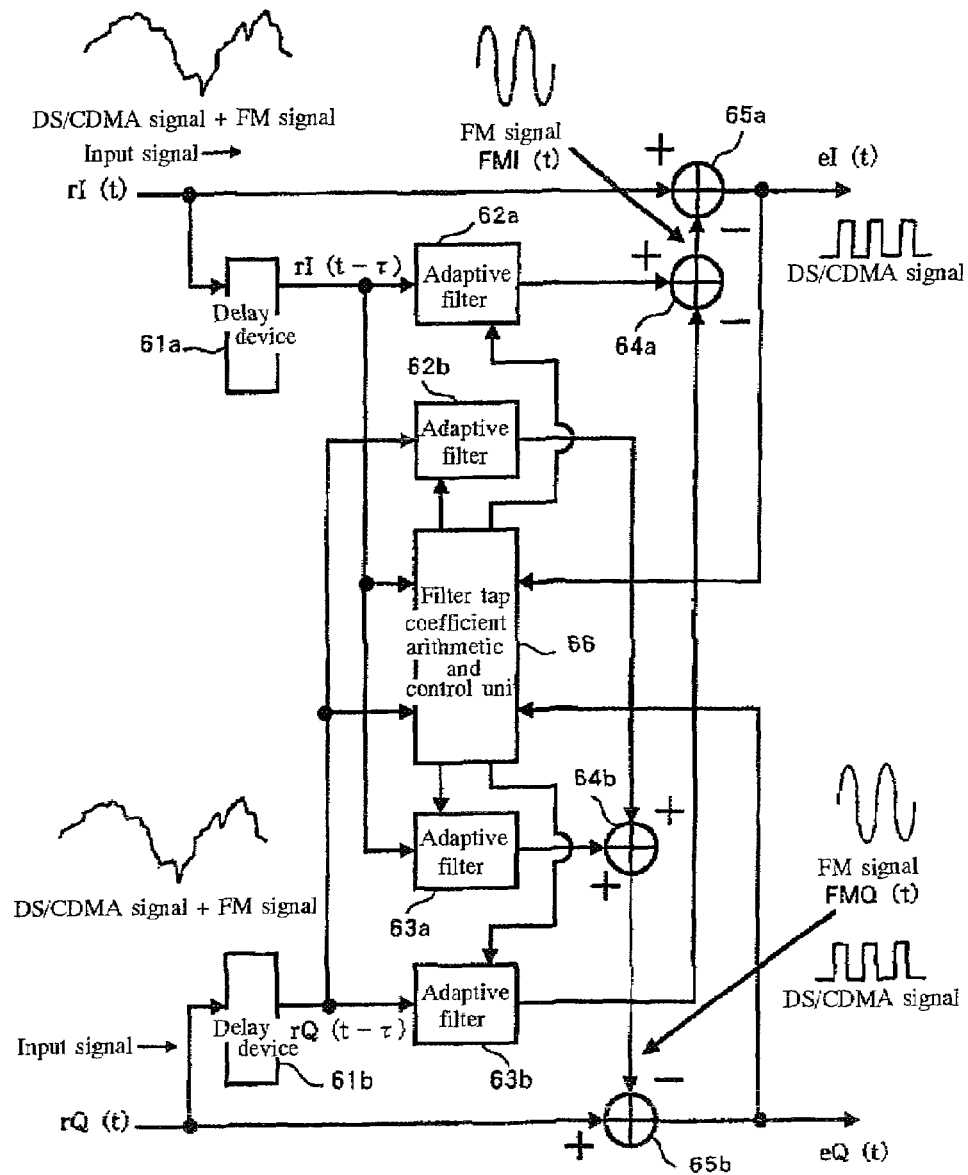
FIG. 16 is a diagram showing an interference signal removal system.
Figure 17:
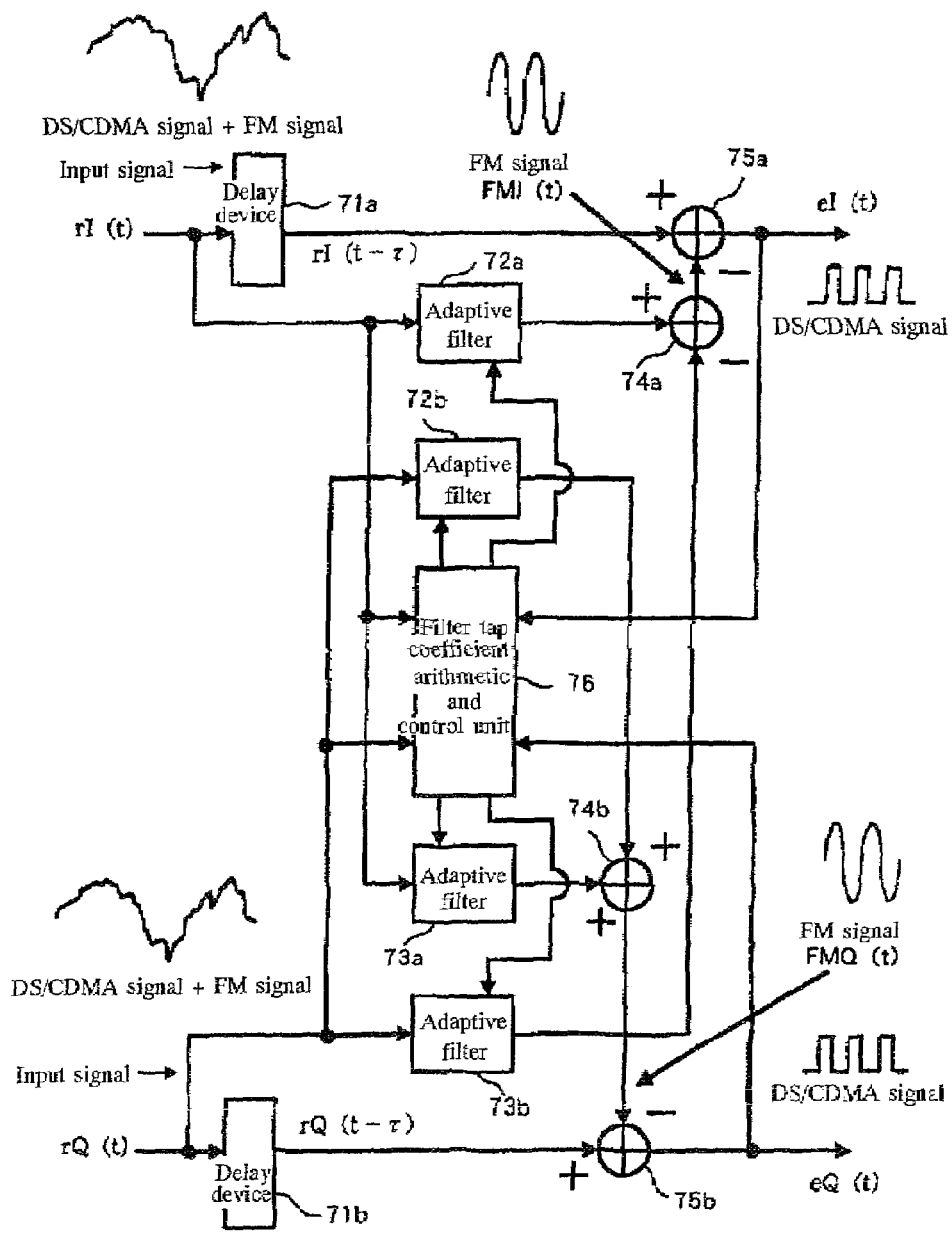
FIG. 17 is a diagram showing an interference signal removal system.

FIG. 1 shows an interference signal removal system according to the present invention. This interference signal removal system has a configuration obtained by applying the present invention to, for example, the interference signal removal system shown in FIG. 10. It is installed in a base station or the like provided in a mobile communications system utilizing CDMA and operates to remove interference signals contained in signals wirelessly received from mobile stations with which the base station communicates.

The interference signal removal system shown in FIG. 1 comprises an interference signal estimator 1, an interference signal extractor 2, a synthesizer 3, a memory element 4 and a timing controller 5. The symbol t in the drawing represents time. This embodiment will be explained for the case where a periodic TDMA signal received as an interference signal is contained in the received signal together with a broadband CDMA signal that is the desired signal.

The interference signal estimator 1 is supplied with a received signal r(t), which is a composite of a broadband desired signal and multiple narrow-band interference signals synthesized on the reception transmission path, and a received signal e(t), which is the received signal after removal of interference. Operating under the control of the memory element 4 and the timing controller 5, the interference signal estimator 1 uses an ordinary adaptive algorithm to estimate the interference signals contained in the received signal r(t) and outputs an interference signal estimation coefficient h(t+1) based on the estimation result to the interference signal extractor 2.

The interference signal extractor 2 is supplied with the received signal r(t), extracts a (presumed) interference signal V(t) from the received signal r(t) based on the interference signal estimation coefficient h(t+1) received from the interference signal estimator 1, and outputs the interference signal V(t) to the synthesizer 3.

The synthesizer 3 synthesizes the received signal r(t) and the interference signal V(t) in opposite phase (i.e., so that the interference signal V(t) is removed from the received signal r(t)) and outputs the received signal e(t) removed of the interference signal V(t). Part of the interference-free received signal e(t) output by the synthesizer 3 is sent to the interference signal estimator 1 and used for interference signal estimation.

The memory element 4, a memory for storing information, is controlled by the timing controller 5 to periodically read and store the interference signal estimation result from the interference signal estimator 1 at a desired rate and to periodically output stored past interference signal estimation result to the interference signal estimator 1 at a desired rate. The interference signal estimation result used in this embodiment is the value of the interference signal estimation coefficient h(t+1) obtained as the final sequential updating result with regard to a past interference signal.

The timing controller 5 operates periodically at a prescribed rate to control the timing of the aforesaid passage of interference signal estimation results between the interference signal estimator 1 and the memory element 4. In this embodiment, the timing controller 5 controls the passage of interference signal estimation results carried out between the interference signal estimator 1 and the memory element 4 in synchronism with the periods of the TDMA signals that are the interference signals. Specifically, the timing controller 5 operates at the completion of the interference signal estimation processing of each period to store the interference signal estimation result in the memory element 4 and operates at the completion of the interference signal estimation processing of each period to read from the memory element 4 the interference signal estimation result obtained one period earlier and to set the read value as the initial value of the interference signal estimation by the interference signal estimator 1. The timing controller 5 conducts these operations upon the passage of the time of every period.

In the interference signal estimation processing of this embodiment, sequential updating of the interference signal estimation coefficient h(t+1) is conducted based on an LMS algorithm, an RLS algorithm or the like and the finally obtained value of interference signal estimation coefficient h(t+1) obtained by the sequential updating one period earlier is used as the initial value of the interference signal estimation coefficient h(t+1) in the interference signal estimation processing in the current period. In other words, this embodiment continuously repeats processing wherein the final value of the interference signal estimation coefficient h(t+1) obtained one period earlier is defined as an initial value, this initial value is sequentially updated based on the interference signal of the current period to obtain a value matched to the current interference signal, the value of the sequentially updated result is stored in memory, and the stored sequentially updated result is used as the initial value of the interference signal estimation coefficient h(t+1) in the interference signal estimation processing of the next period, and so forth.

The operation for removal of interference signals from a received signal of the interference signal removal system according to this embodiment will now be explained for the case where a periodic TDMA signal is received as an interference signal.

Figure 18:
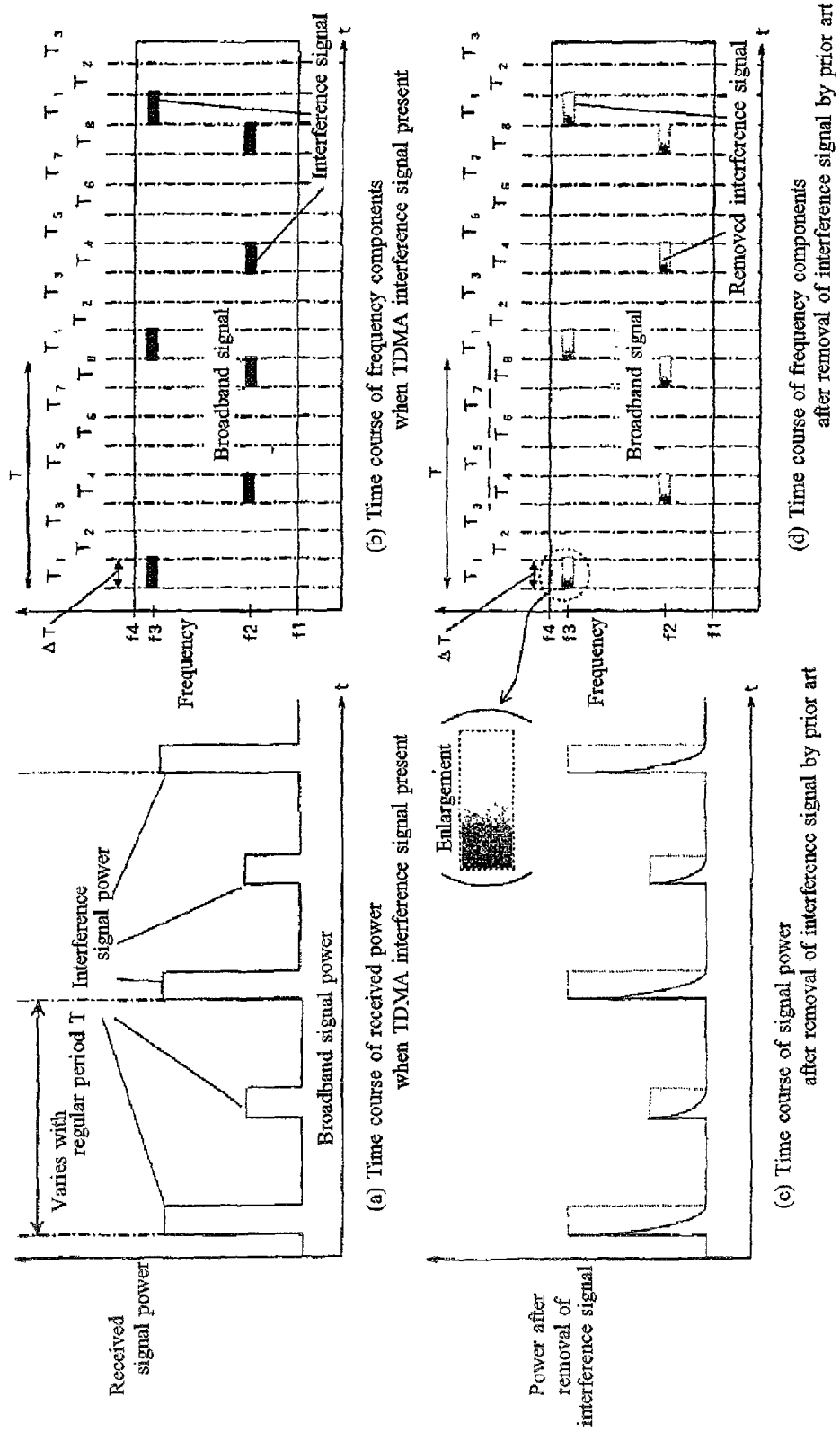
FIG. 18 is a diagram illustrating the operation of a conventional interference signal removal system.

FIG. 2(a) is a diagram similar to that of FIG. 18(a) showing an example of the time course of the received power of a received signal when a periodic TDMA signal is superimposed as an interference signal on a broadband signal such as a CDMA signal received as the desired signal. In the drawing, time (t) is represented on the horizontal axis and received power on the vertical axis.

FIG. 2(b) is a diagram similar to that of FIG. 18(b) showing an example of the time course of received signal frequency components when a broadband desired signal receives interference from TDMA signals in two different frequency bands. The horizontal axis of the chart represents time (t) and the vertical axis frequency. On the horizontal axis representing time elapse, the time T of each period is divided into 8 time periods T1–T8 of equal time width ΔT.

FIG. 2(c) shows an example of the time course of the power of the interference-removed received signal obtained by removing the TDMA signal (the interference signal) from the received signal shown in FIG. 2(a) using the interference signal removal system of this embodiment. The horizontal axis of the chart represents time (t) and the vertical axis represents received signal power after interference signal removal. For convenience of explanation, FIG. 2(c) shows power of the received signal after removal of the interference signals by a solid curve and the interference signal before interference signal removal by a dotted curve.

FIG. 2(d) shows an example of the time course of the frequency components of the interference-removed received signal obtained by removing the TDMA signals (the interference signals) from the received signal shown in FIG. 2(b) using the interference signal removal system of the present invention. The horizontal axis of the chart represents time (t)

and the vertical axis frequency. Places where interference signal components remain are represented in shades of gray. The shading approaches white with decreasing amount of remaining interference signal after interference removal.

In the interference signal removal system of this embodiment, periodic interference signals such as TDMA signals are received and the periods thereof are ascertained and set in advance, and, based on these settings, the interference signal estimation results for one period earlier are used in the interference signal estimation processing. Thus, as shown in FIGS. 2(c) and 2(d), for example, the accuracy of interference signal estimation at the beginning of the reception of interference signals that vary intensely, such as TDMA signals, is improved relative to that when using a conventional interference signal removal system. Efficient interference signal removal can therefore be realized.

In the case of a periodic interference signal, e.g., a TMDA signal, the level, waveform etc. of the current interference signal can be expected to be identical or similar to the level, waveform etc. of the interference signal one period earlier. The interference signal estimation accuracy at the initial stage of interference signal estimation processing in the current period can therefore be improved by using the interference signal estimation result obtained one period earlier as the initial value of the interference signal estimation processing in the current period. As a result, the accuracy of the interference signal estimation and efficiency (speed) of the interference signal removal processing can be upgraded.

As shown in FIG. 2(d), in this embodiment the interference signal estimation processing is conducted once every unit time period T1–T8. Specifically, the initial value of the interference signal estimation coefficient h(t+1) is set and sequential updating is commenced at the start of each unit time period T1–T8 and the value of the interference signal estimation coefficient h(t+1) at the end of each unit time period T1–T8 is defined as the interference signal estimation result for the unit time period T1–T8 concerned.

In order to realize this interference signal estimation processing, the timing controller 5 in this embodiment operates, for example, at the time of the shift from the unit time period T1 to the unit time period T2 to store the result of the estimation of the interference signal received during the unit time period T1 (the interference signal estimation result) in the memory element 4 At the same time, it reads from the memory element 4 the interference signal estimation result stored in the memory element at the end of unit time period T2 one period earlier and forwards the read interference signal estimation result (in this embodiment, the value obtained as the result of sequentially updating the interference signal estimation coefficient h(t+1) for interference signal extraction) through the interference signal estimator 1 to the interference signal extractor 2, thereby enabling the interference signal in the unit time period T2 to be removed immediately and more accurately than by the prior art.

Similarly, the timing controller 5 in this embodiment operates at the time of the shift from the unit time period T2 to the unit time period T3, . . . , and from unit time period T8 to the unit time period T1 to successively update the value of the stored interference signal estimation result at each unit time period T1–T8 during the passage of the period T and also sets the initial value of the interference signal estimator 1 to the value of the interference signal estimation result one period earlier. As a result, it is possible, without speeding up the sequential computation, to realize efficient interference signal removal in response to interference signals that, like TDMA signals and FHSS signals, cause interference at the same frequency once every given period.

In this embodiment, the time interval ΔT of the unit time periods that are the unit times for conducting control by the timing controller 5 and time width ΔT during which one interference signal portion is continuously received are set at the same value. The invention is not limited to this arrangement, however, and it suffices to adopt a configuration whose control timing period for storing/reading the interference signal estimation result in/from memory as the interference signal estimation coefficient h(t+1) is the same as the interference signal period. In this embodiment, the term "one interference signal portion" is used with regard to an interference signal, such as a TDMA signal, that repeatedly appears and disappears periodically with passage of time to indicate with respect to a single appearance/disappearance the signal present between the appearance and disappearance. Specifically, the term refers to the individual interference signals of time width At shown in black in FIG. 2(b).

The time width of the individual unit time periods that are the unit times during which the timing controller 5 conducts control can be set smaller than the time width during which one interference signal portion is continuously received. In the present embodiment, this time width is set to value such as (ΔT/8). When the time width of the individual unit time periods that are the unit times during which the timing controller 5 conducts control is set to a small value, then, in a case where the times at which TDMA signals or other such periodic interference signals are received do not coincide with the time of transitions between the unit time periods, the impact of such timing offset on interference signal removal performance can be held to a very low level.

As explained in the foregoing, in the interference signal removal system of this embodiment, when a received signal to be processed is a composite of a broadband desired signal and multiple narrow-band interference signals synthesized on the reception transmission path, the interference signal estimator 1 estimates the interference signals contained in the received signal that are present within the frequency range of the desired signal, the interference signal extractor 2 extracts the interference signal contained in the received signal based on the estimation, and the synthesizer 3 removes the interference signal from the received signal by reversing the phase of the interference signal extracted by the interference signal extractor 2 synthesizing it with the received signal. In the course of this processing, the timing controller 5 controls prescribed periodic passage of interference signal estimation results between the interference signal estimator 1 and the memory element 4, thereby causing the memory element 4 to store/read interference signal estimation results of the interference signal extractor 2 at the prescribed periodicity.

Further, in the case of interference signals that arrive at known intervals, the interference signal removal system of this embodiment operates synchronously with the time of interference signal reception to store interference signal estimation results in the memory element 4 once every prescribed period and, at the start of the next period, to read the interference signal estimation results from the memory element 4 and use them in interference signal estimation processing. It is therefore possible to shorten the time required for interference signal estimation with respect to TDMA signals and FHSS signals, which have a known arrival period, thereby increasing response speed, and also to improve the accuracy of interference signal estimation. As a result, interference signals that vary intensely, such as TDMA signals, can be removed with good accuracy even at the beginning of their reception, making it possible to remove such interference signals with high reliability. Thus, in order to enhance the effectiveness of interference signal removal processing with respect to interference signals that, like TDMA signals, are received with a known periodicity, this embodiment of the interference signal removal system according to the present invention defines the transmission period from the source of the interference signals as one period and conducts interference signal estimation using as the initial value the interference signal estimation result stored in memory one period earlier. This enables ready response to change in the interference signal power when the interference is first received.

With this embodiment of the interference signal removal system, when an interference signal whose period differs from those that appeared in the past newly appears, or when an interference signal that appeared periodically in the past stops appearing, the system is required to adapt to the change in the communications environment. Once the adjustment necessitated by change in the communications environment has been implemented, however, efficient interference signal removal can once again be conducted. Moreover, the time needed for adapting to such a communications environment change is so short as to have no impact on performance from the practical viewpoint.

The foregoing discussion assumes that the period of the interference signal is known. When the period is unknown, it is possible to use the timing of received signal power change, such as that exemplified in FIG. 2($a$), without modification as the control timing for storing and reading interference signal estimation results. By switching the value of the interference signal estimation coefficient $h(t+1)$ immediately before the power of received signal changes (e.g., by setting the initial value), quick response can be made to the interference signal power change. In other words, the interference signal removal system having such configuration can discriminate the presence/absence of an interference signal in the received signal based on change in the power of the received signal, generate control timing from the discrimination result, and operate the timing controller 5 to control the storing and reading of the interference signal estimation results in accordance with the generated control timing. When change appears in the received power of the received signal at two or more different levels, it is possible to treat the timing of the change at each level as the receive timing of a different interference signal and use this timing as the control timing for the interference signal concerned.

In a case where a communication signal is transmitted from the source only at times when communication is necessary but a control signal is constantly transmitted, the interference signal removal system of this embodiment can generate the control timing based on the received power of a signal certain to arrive in a known frequency band, such as a PHS or TDMA control channel signal. When interference is constantly received in the receive band, as in the case of interference from an FHSS signal, it is difficult to generate the control timing based on the power of the received signal but it is still possible to estimate the timing of FHSS signal frequency switching by monitoring the received power of a frequency channel on which a control channel signal or the like is known to be certain to arrive and then using the receive timing of the control channel signal for control timing. By this, more stable interference signal removal can be performed. The received power of a particular channel can be monitored by any of various methods, such as by the method of passing the received signal through a narrow-band filter to extract the signal component of the band concerned and monitoring the power of the extracted signal component.

Thus, in this embodiment of the interference signal removal system, the interference signal estimation result output by the interference signal estimator 1 for estimating narrow-band interference signals superimposed on a broad-band signal is stored in the memory element 4 and a past interference signal estimation result stored in memory is used to remove the interference signal from the received signal. More specifically, the operations include outputting stored interference signal estimation results to the interference signal estimator 1 at regular intervals, storing the sequentially updated value of the interference signal estimation coefficient $h(t+1)$ obtained one period earlier as the interference signal estimation result and using this sequentially updated value as the initial value for sequentially updating the interference signal estimation coefficient $h(t+1)$, and storing/reading the interference signal estimation results at timing matched to the received power or the power of a particular frequency component contained in the received power.

In this embodiment, the interference signal that appears repeatedly with passage of time is an interference signal that appears periodically in the manner of a TDMA signal or FHSS signal. As explained in the foregoing, the period can be set in advance, or the period of the interference signal can be decided based on change in the power of the received signal, or the period of the interference signal can be decided based on change in the power of a signal of prescribed frequency contained in the received signal.

As a control coefficient, this embodiment uses the interference signal estimation coefficient $h(t+1)$.

As the past interference signal estimation result used for interference signal estimation, this embodiment uses the final value of the interference signal estimation coefficient $h(t+1)$ obtained as the final sequential updating result one period earlier.

Figure 2:
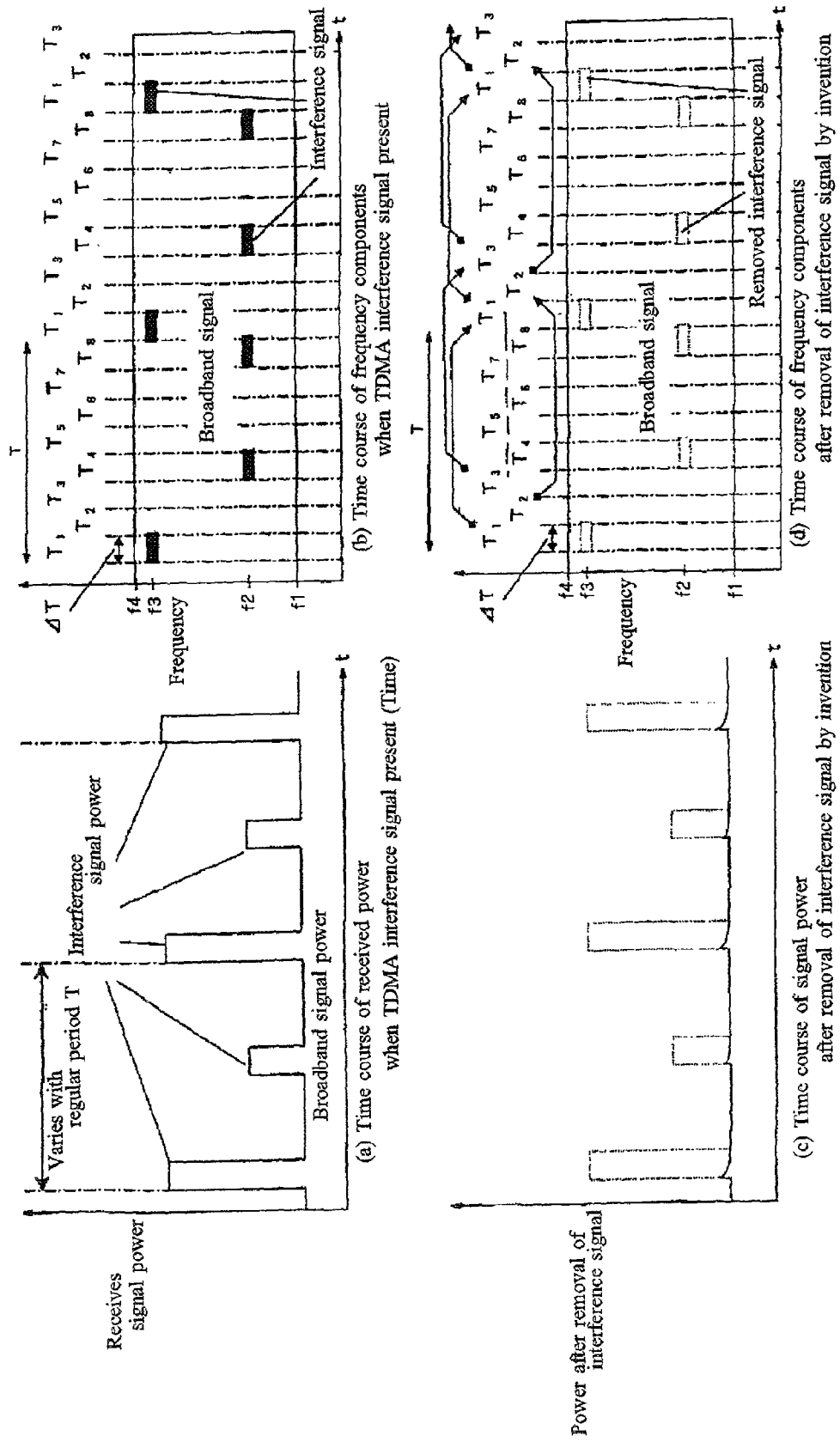
FIG. 2 is a diagram illustrating the operation of the interference signal removal system.

As the prescribed unit time periods, this embodiment uses unit time periods T1–T8 of equal time width ΔT such as shown in FIGS. 2($b$) and 2($d$).

The interference signal estimating means of this embodiment is constituted by the function of the interference signal estimator 1 that estimates the interference signal contained in the received signal r(t) based on the received signal r(t) and result e(t) obtained by removing me interference signal from the received signal.

The interference signal extracting means of this embodiment is constituted by the function of the interference signal extractor 2, and the interference signal removing means thereof is constituted by the function of the interference signal extractor 2 and the function of the synthesizer 3.

In this embodiment, memory element 4 corresponds to the memory for storing the interference signal estimation result, the timing controlling means is constituted by the function of the timing controller 5, and the interference signal estimation controlling means is constituted by the functions of the memory element 4 and the timing controller 5.

A configuration combining an interference signal removal system that is an embodiment of the present invention and another interference signal removal system will now be explained. The interference signal removal system of this embodiment is, for example, one for removing interference signals from a received signal in a base band (BB). As the other interference signal removal system is used, by way of example, an interference signal removal system for removing interference signals from a received signal in a radio frequency (RF) band or an intermediate frequency (IF) band.

Figure 3:
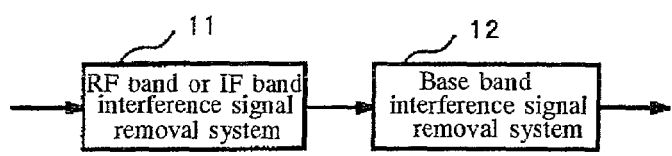
FIG. 3 is a diagram showing an RF band or IF band interference signal removal system combined with a BB (base band) interference signal removal system.

FIG. 3 shows a configuration in which a first stage RF or IF band interference signal removal system 11 and a second stage BB interference signal system 12 are connected in series. In this configuration, RF or IF band interference signals contained in a received signal are removed by the first stage interference signal removal system 11 and BB band interference signals remaining in the received signal are then removed by the second stage interference signal system 12. Therefore, in a case where the interference signal power is extremely strong and sufficient interference removal cannot be achieved in the BB interference signal system 12 owing to insufficient A/D converter resolution, for example, a configuration can be adopted in which the first stage RF or IF band interference signal removal system 11, even if not being capable of completely removing the strong interference waves, can attenuate them to a degree that enables the BB interference signal system 12 to achieve adequate A/D converter resolution.

Although FIG. 3 shows a two-stage series connection of the RF or IF band interference signal removal system 11 and the BB interference signal system 12, there is no particular limit on the interference signal removal method or the number of stages. If necessary to achieve sufficient interference signal removal, multiple stages of the RF or IF band interference signal removal system can be connected in series and/or multiple stages of the BB interference signal removal system can be connected in series.

As the BB band interference signal system 12 can be used, for example, the interference signal removal system according to the invention shown in FIG. 1. By combining it with the RF or IF band interference signal removal system 11 as shown in FIG. 3, still better interference signal removal performance can be realized. On the other hand, since the interference signal removal system according to the present invention shown in FIG. 1 can be implemented in the RF band or IF band, it can be used as the RF or IF band interference signal removal system 11. By combining such an interference signal removal system 11 with the BB interference signal system 12 as shown in FIG. 3, still better interference signal removal performance can be realized.

Moreover, the interference signal removal system according to the invention shown in FIG. 1 can be used as both the RF or IF band interference signal removal system 11 and the BB interference signal system 12. By combining them as shown in FIG. 3, still better interference signal removal performance can be realized.

Any of various interference signal removal systems can be used as the RF or IF band interference signal removal system 11 and the BB interference signal system 12. This will be more apparent from Examples 1 to 5 explained hereinafter.

Figure 4:
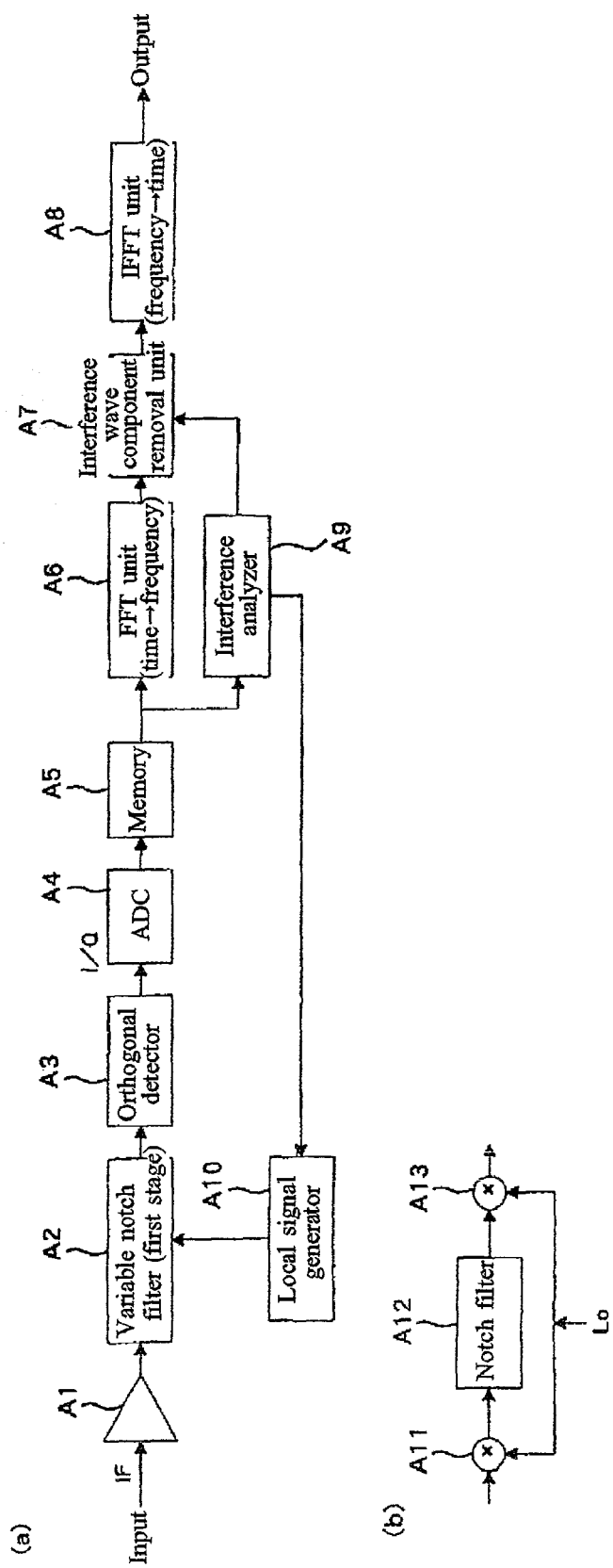
FIG. 4 is a diagram showing a first combinable interference signal removal system.

As shown in FIG. 4(a), Example 1 uses a combination of an interference signal removal system 11 and an interference signal system 12.

The interference signal removal system illustrated in FIG. 4(a) receives an IF band received signal as input. The input signal is amplified by an amplifier A1, the amplified input signal is filtered by a first stage variable notch filter A2, the filtered input signal is orthogonally detected by an orthogonal detector A3 to obtain an I component and a Q component, these components are A/D converted by an ADC (Analog Digital Converter) A4, and the digital data resulting from the A/D conversion are stored in a memory A5.

Further, in this interference signal removal system, the data stored in the memory A5 are fast Fourier transformed from time components to frequency components by an FFT unit A6, interference wave analysis is conducted based the transformed data by an interference analyzer A9, the interference wave component is removed from the fast Fourier transformed data based on the analysis result by an interference wave component removal unit A7, and the data after interference wave removal are inverse Fourier transformed from frequency components to time components and output by an iFFT unit A8. In addition, a local signal generator A10 of the interference signal removal system is controlled based the analysis result of the interference analyzer A9, thereby controlling the frequency band delimited by the first stage variable notch filter A2. The interference analyzer A9 includes a memory element that is used as described regarding the present invention to store the center frequencies of the periodically changing interference signals and the local signal generator A10 is controlled at predicted timing, thereby enabling removal of periodically varying strong interference signals. When no interference signal is present, the band of the first stage variable notch filter A2 is moved outside the frequency band of the broadband signal so as not to degrade the quality of the broadband signal. If the interference cannot be completely removed by the first stage variable notch filter A2, the remaining interference signal components can be removed by the second stage BB unit, because it is able to achieve sufficient resolution.

The second stage BB processing unit performs FFT analysis at specific time intervals, and when an interference signal is detected as a result, the frequency band portion of the interference signal is replaced with 0, whereafter it is restored to the original signal by FFT processing. TDMA signals and the like can therefore be removed without carrying out the operations described with respect to the present invention of analyzing and storing the periodic power of the interference signal and switching the coefficient in synchronism with the interference signal period. Since data must be stored in the amount required for computation in the FFT/iFFT processing, however, tolerance to signal delay is low. When this is a problem, the BB interference signal removal system can be replaced with one of the invention type like that shown in FIG. 1.

FIG. 4(b) shows the configuration of the variable notch filter A2. The variable notch filter A2 comprises mixers A11 and A13 installed before and after a notch filter A12 of fixed center frequency. The mixers A11 and A13 mix the frequency of the local signal from the local signal generator A10 with the input signal.

Figure 5:
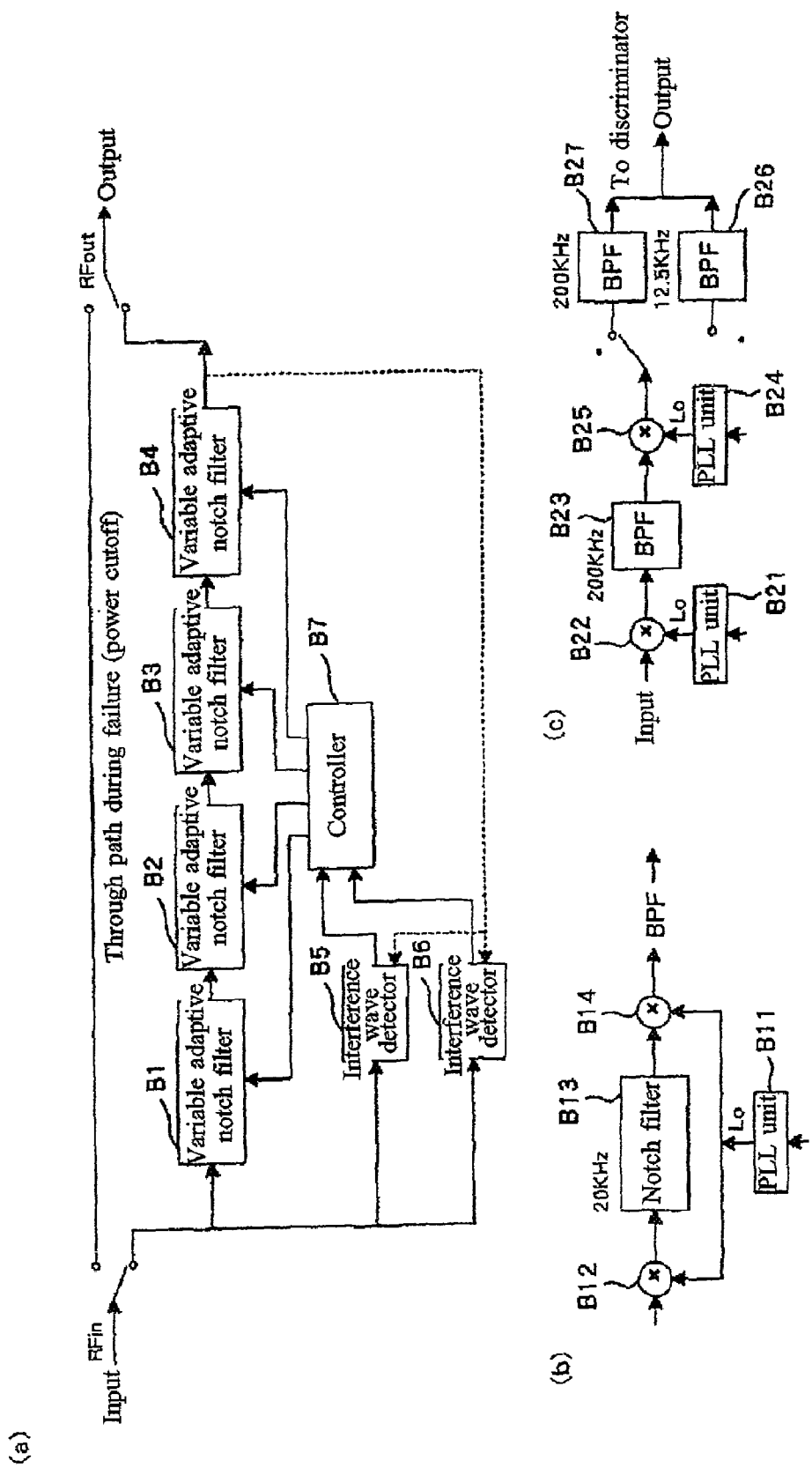
FIG. 5 is a diagram showing a second combinable interference signal removal system.

Example 2 is shown in FIG. 5(a). In this Example 2, the interference signal removal system 11 is combinable with the interference signal system 12 of this embodiment, comprises multiple stages of the variable notch filter A2 shown in FIG. 4(a), and is capable of utilizing the method described earlier with respect to the present invention.

The interference signal removal system illustrated in FIG. 5(a) receives an RF band received signal as input. The input signal is filtered by four variable notch filter stages B1–B4 and then output. The output from the final variable notch filter stage B4 is fed back to interference detectors B5 and B6 that detect interference waves contained in the input signal, and a controller B7 controls the frequency bands delimited by the respective variable adaptive notch filters B1–B4 based on the detection result. The interference signal removal system is further equipped with a through path for directly connecting the received signal input and output terminals during a failure (power outage).

FIG. 5(b) shows the configuration of the variable notch filters B1–B4. Each of the variable notch filters B1–B4 comprises mixers B12 and B14 installed before and after a notch filter B13 of fixed center frequency. The mixers B12 and B14 mix the frequency from a PLL (Phased Locked Loop) unit B11 with the input signal. The PLL unit B11 is controlled by the controller B7.

FIG. 5(c) shows the configuration of the interference wave detectors B5 and B6. In each of the interference wave detectors B5 and B6, the input signal and a local signal from a PLL unit B21 are mixed in a mixer B22, the mixed signal is filtered by a band pass filter (BPF) B23, and the filtered input signal is mixed with a local signal from a PLL unit B24 in a mixer B25. Further, in each of the interference wave detectors B5 and B6, the output from the mixer B25 is filtered by a band pass filter B27 having a broad passband, a primary discrimination regarding the presence/absence of interference waves is conducted by comparing the power within the respective bands. Then, with regard to the bands in which interference waves were found to be present, a secondary discrimination is conducted to determine presence/absence of interference waves within finely divided bands obtained by filtering the output with a band pass filter B26 having a narrow bandpass. Similarly to what was explained earlier, the controller B7 that controls the variable notch filters B1–B4 stores the analysis results of the varying interference signals and, by controlling the center frequencies of the notch filters B1–B4 in synchronism with the periods of the interference signals, enables the removal of periodically varying interference signals in the RF band or IF band. Since the center frequencies of the variable notch filters B1–B4 in this case enable removal of four waves at the same time, the fact that application of the method of the present invention makes it possible to independently deal with multiple TDMA signals arriving with different timing, although not enabling simultaneous removal of four waves, does in fact enable interference signal removal to be conducted with respect to four or more TDMA signals.

Figure 6:
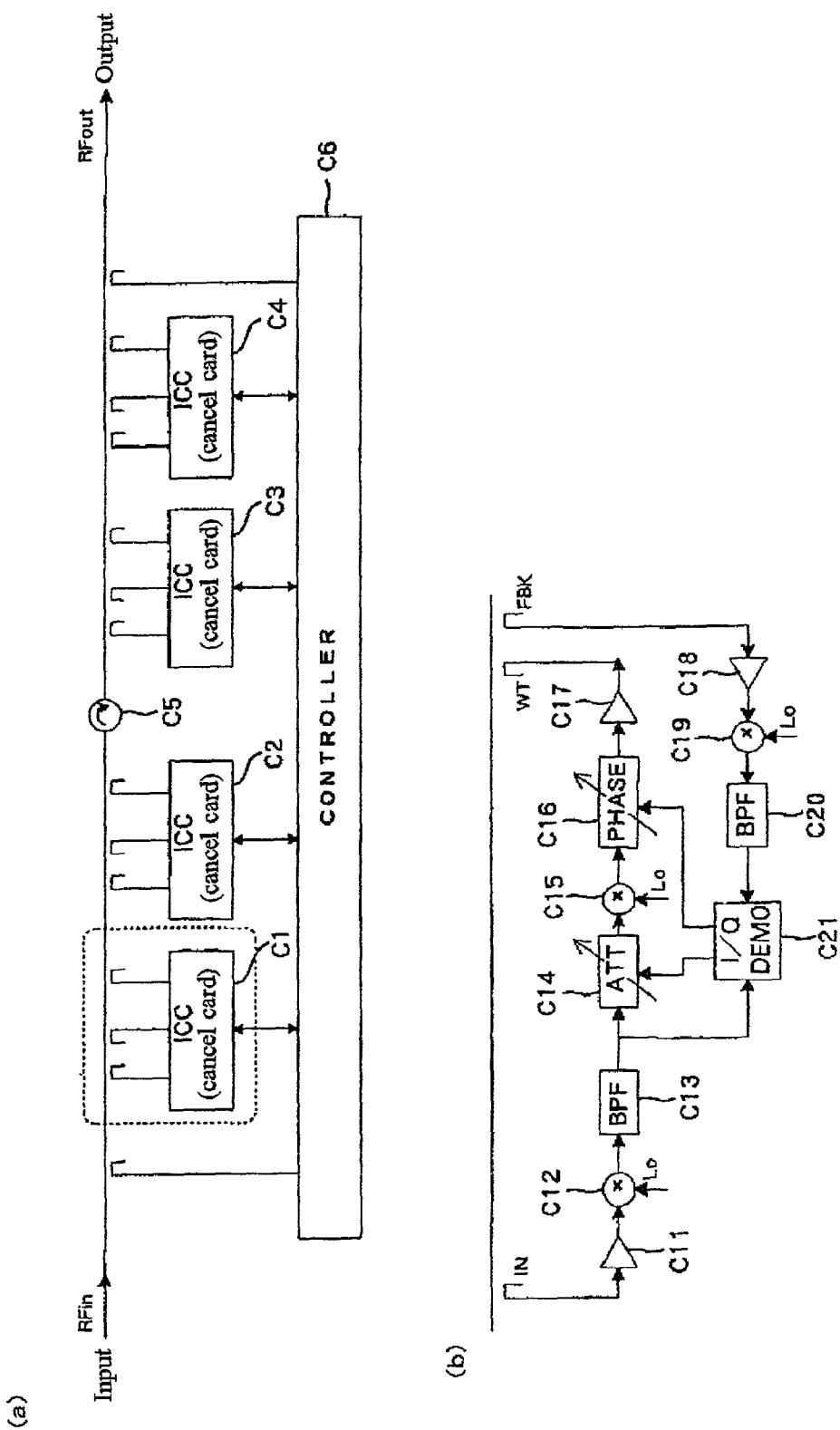
FIG. 6 is a diagram showing a third combinable interference signal removal system.

Example 3 is shown in FIG. 6(a). In this Example 3, the interference signal removal system 11 is combinable with the interference signal system 12 of this embodiment and is capable of utilizing the method described earlier with respect to the present invention.

The interference signal removal system illustrated in FIG. 6(a) receives an RF band received signal as input. Up to the time that the input signal is output through a transfer line having an isolator C5, interference waves are removed from the received signal by four cancel cards C1–C4 controlled by a controller C6.

FIG. 6(b) shows the configuration of the cancel card C1 portion enclosed by a dotted line in FIG. 6(a). The other cancel cards C2–C4 are similarly configured.

Specifically, each of the cancel cards C1–C4 receives the received signal transferred on the transfer line as input. The input signal is amplified by an amplifier C11, the amplified signal is mixed with a local signal by a mixer C12, the mixed signal is filtered by a band pass filter C13, the filtered input signal is attenuated by an variable attenuator C14, the attenuated signal is mixed with a local signal by a mixer C15, the mixed signal is phase shifted by a variable phase shifter C16, and the output of the variable phase shifter C16 is amplified by an amplifier C17 and output to the original transfer line. Further, in the cancel cards C1–C4, the signal output to the original transfer line is acquired through a feedback path, the signal is amplified by an amplifier C18, the amplified signal is mixed with a local signal by a mixer C19, the mixed signal is filtered by a band pass filter C20, and the variable attenuator C14 and the variable phase shifter 16 are controlled by a controller (I/Q DEMO) C212 based on the outputs of the filtered result and the output of the band pass filter C13. Similarly to what was explained earlier, the controller C6 that controls the cancel cards C1–C4 stores the analysis results of the varying interference signals and, by controlling the center frequencies of the band pass filters (BPFs) C13 of the cancel cards C1–C4 every unit time, enables the removal of periodically varying interference in accordance with the invention as described in the foregoing. Similarly to what was explained with regard to the Example 2, simultaneous removal of four waves in not possible but application of the present invention does enable interference signal removal to be conducted with respect to four or more TDMA signals.

Figure 7:
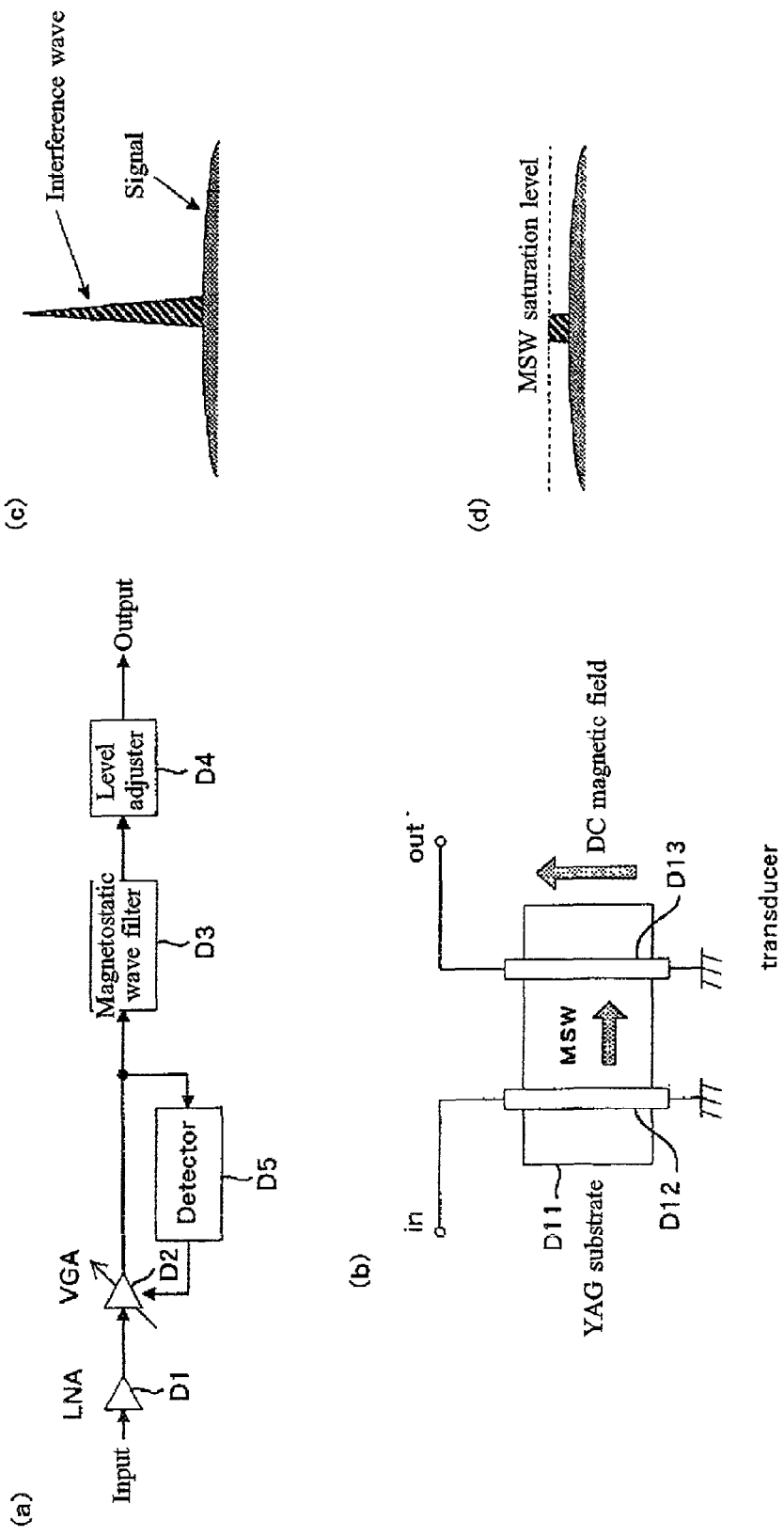
FIG. 7 is a diagram showing a fourth combinable interference signal removal system.

Example 4 is shown in FIG. 7(a). In this Example 4, the interference signal removal system 11 is combinable with the interference signal system 12 of this embodiment and is capable of utilizing the method described earlier with respect to the present invention.

The interference signal removal system illustrated in FIG. 6(a) receives an RF band received signal as input. The received signal is amplified by a low noise amplifier (LNA) D1, the amplified signal is amplified by a variable gain amplifier (VGA) D2, the amplified input signal is filtered by a magnetostatic wave filter D3, and the filtered input signal is adjusted in level and output by a level adjuster D4. Further, in this interference signal removal system, the output from the variable gain amplifier D2 is detected by a detector D5 and the detection result is used to control the variable gain amplifier D2.

FIG. 6(b) shows the configuration of the magnetostatic wave filter D3. The magnetostatic wave filter D3 consists of transducers D12, D13 provided on a YAG substrate D11. The magnetostatic wave filter D3 can utilize a MSW (Magnetostatic Wave) to suppress signal components above a threshold value irrespective of band, and uses this capability to remove interference waves.

FIG. 6(c) shows the spectrum of a signal containing an interference wave. FIG. 6(d) exemplifies the spectrum of the same interference wave when suppressed by the MSW up to the MSW saturation level. It is known that when the input to the magnetostatic wave filter D3 is excessively large, the output becomes distorted. However, similarly to what was explained earlier, by applying the method of the present invention, i.e., by storing the analysis results of the varying interference signals stored in the detector D5 and effecting periodic optimum level control of the variable gain amplifier (VGA) D2, it is possible set an optimum threshold even when the level of the interference waves varies periodically.

Example 5 is shown in FIG. 8(a). In this Example 4, the interference signal removal system 12 is combinable with the interference signal system 12 of this embodiment.

The interference signal removal system illustrated in FIG. 8(a) receives an RF band received signal as input. The input signal is split into two signals. One of the split signals is sent through a filter (H1) E2, a decimator E24, an interpolator E25 and a filter (F1) E26 and output to an adder E27. The other split signal is sent through a filter (H0) E1 and a decimator E3 to be further split in two. One split signal from the decimator E3 is sent through a filter (H1) E5, a decimator E18, an interpolator E19 and a filter (F1) E20 and output to an adder E21. The other split signal from the decimator E3 is sent through a filter (H0) E4 and a decimator E6 to be further split in two.

One split signal form the decimator E6 is sent through a filter (H1) E8. a decimator E12, an interpolator E13, and a filter (F1) E14 and output to an adder E15. The other split signal from the decimator E6 is sent through a filter (H0) E7, a decimator E9, an interpolator E10 and a filter (F0) E11 and output to an adder E15. The adder 15 sums its two inputs and sends the result through an interpolator E16 and a filter (F0) E17 to an adder E21. The adder 21 sums its two inputs and sends the result through an interpolator E22 and a filter (F0) E23 to an adder E27. The adder E27 sums its two inputs and outputs the result.

The filters E1, E2, E4, E5, E7, E8, E11, E14, E17, E20, E23 and E26 are complex bandsplitting filters. In this Example, the configuration shown in FIG. 8(a) successively and equally splits the input signal band and then, after removal of the interference waves from the split bands, recombines them into the original band.

The decimators E3, E6, E9, E12, E18 and E24 decimate the signal. In this Example, the filters split the signal band in half, so decimation is conducted to reduce the number of oversamplings.

The interpolators E10, E13, E16, E19, E22 and E25 interpolate the signals, which has the opposite effect from decimation. In this Example, the adders double the signal band, so interpolation is conducted to increase the number of oversamplings.

Figure 8:
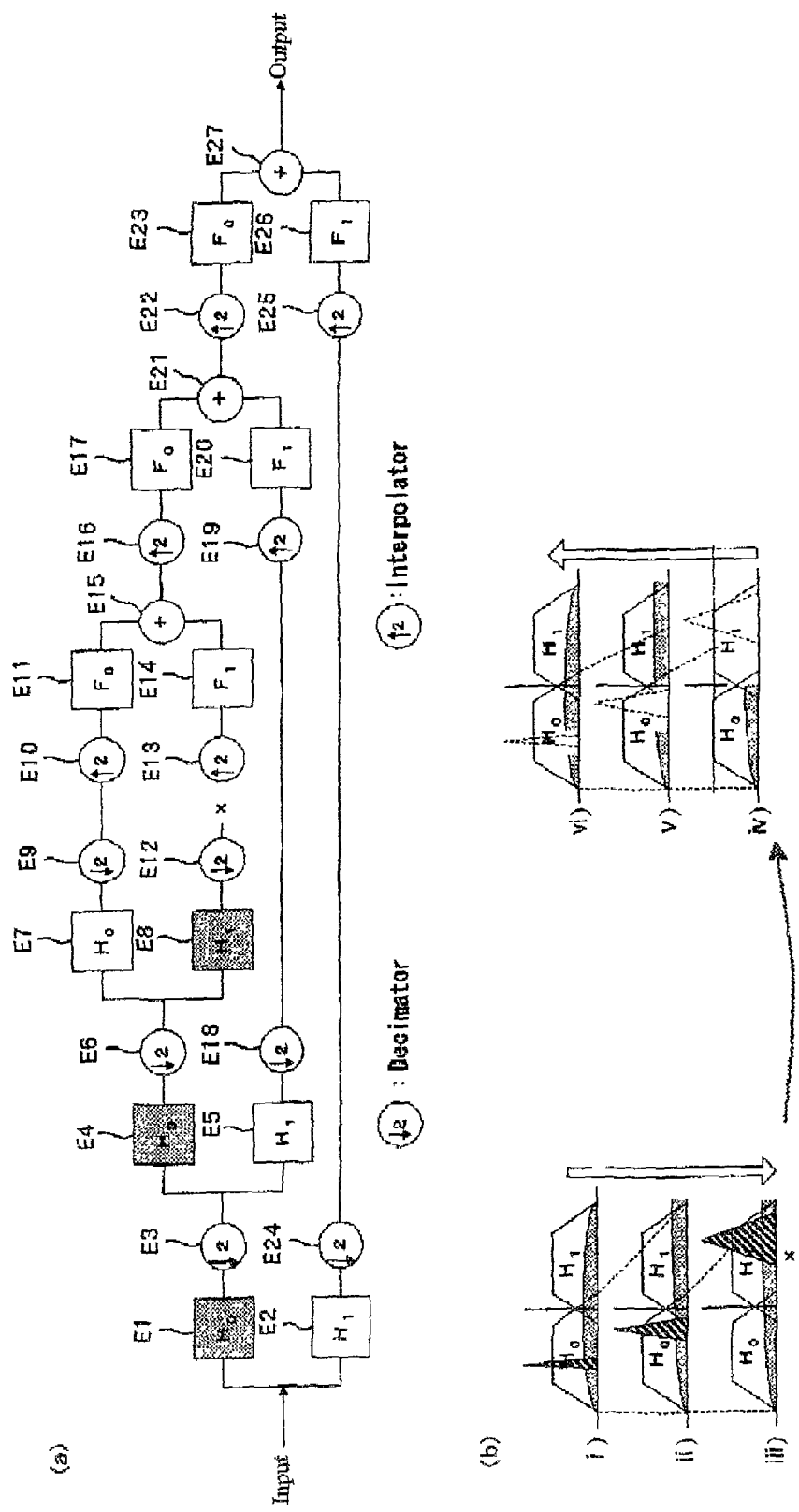
FIG. 8 is a diagram showing a fifth combinable interference signal removal system.

FIG. 8(b) shows an example of how the configuration illustrated in FIG. 8 (a) removes an interference wave from an input signal. The principle of interference wave removal will now be explained with reference to this drawing.

First, the input signal band is split in two and the powers of the two split bands are compared (see i)). Next, the band with higher power is split and the power of the two split bands compared (see ii)). This is repeated as many times as necessary (e.g., three times; see iii)) and the band of the two finally split bands whose power is higher is removed as an interference component (see iv)). The split bands produced by the foregoing are then recombined (see v)) to restore the band of the original input signal (see vi)) and obtain the input signal removed of the interference wave.

A second embodiment of the interference signal removal system according to this invention will now be explained.

This embodiment will be explained with regard to the case where the present invention is applied to an interference signal removal system that, similarly to the interference signal removal systems taught by Japanese Patent Application Nos. 2000-3284437 and 2000-328740, removes an interference signal from an input signal containing a broadband desired signal and a narrow-band interference signal by extracting the interference signal contained in the input signal while suppressing the amount of the extraction based on the input signal, and removes the extracted interference signal from the input signal.

Figure 9:
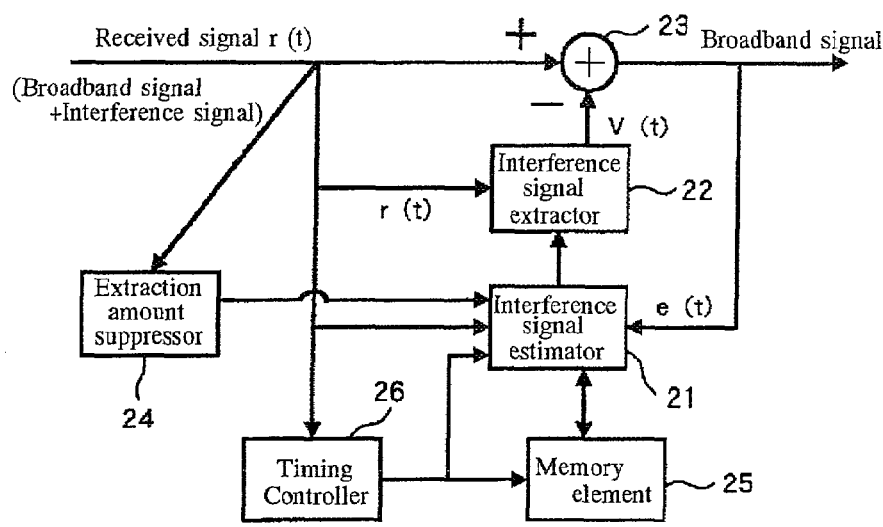
FIG. 9 is a diagram showing the present invention applied to an interference signal removal system that suppresses interference signal extraction amount.

FIG. 9 shows an example of the configuration of the second embodiment of the interference signal removal system according to the present invention. The illustrated interference signal removal system is equipped with an interference signal estimator 21, an interference signal extractor 22, an interference signal extractor 22, an extraction amount suppressor 24, a memory element 25 and a timing controller 26.

The configuration and operation of the interference signal removal system shown in FIG. 9 are the same as the configuration and operation of the interference signal removal system of FIG. 1 except for the point that in the interference signal removal system of FIG. 9 the extraction amount suppressor 24 controls the interference signal estimator 21 based on the received signal r(t) so as to suppress the extraction amount of the interference signal extracted by the interference signal extractor 22 based on the interference signal estimation result of the interference signal estimator 21 and thereby prevent removal of the desired signal from the received signal. The present invention can thus be applied to an interference signal removal system that suppresses the amount of interference signal extraction.

The interference signal removal system, base station and the like according to the present invention are not limited to the foregoing configurations and various other configurations can also be adopted.

In addition, the applicable fields of the present invention are in no way limited to those set out above, but rather the present invention is applicable to various fields. While application of the present invention to a base station utilizing CDMA was explained in the foregoing, the interference signal removal system according to the present invention can also be incorporated in a relay (amplification) station, a mobile station or the like. It can also be incorporated in the receiver of other types of communications systems and, for example, can be incorporated in a communications system that utilizes TDMA, FDMA or some other method.

The various types of processing carried out in the interference signal removal system, base station and the like of the present invention can, for example, be conducted by physical means equipped with a processor, memory and the like wherein the processor controls the processing by executing a control program stored in a ROM. Otherwise it can be conducted by independent physical circuits constituting functional means for executing the different processing operations.

Moreover, the present invention can be construed as being constituted of a control program or of a Floppy® disk, CD-ROM or other computer-readable recording medium storing the control program, and the processing according to the present invention can be carried out by loading the control program from the recording medium into a computer and executing it by use of the processor.

As explained in the foregoing, when the interference signal removal system according the present invention removes an interference signal that appears repeatedly with passage of time, e.g., a periodic interference signal, from a received signal, it estimates the interference signal contained in the received signal based on a past interference signal estimation result, e.g., the interference signal estimation result one period earlier, and removes the estimated interference signal from the received signal. It can therefore realize effective interference signal removal in such aspects as interference signal estimation accuracy and processing speed.

What is claimed is:

1. An interference signal removal system for removing from a received signal an interference signal that appears repeatedly with a passage of time, which system is characterized in that it estimates the interference signal contained in the received signal based on a past interference signal estimation result and removes the estimated interference signal from the received signal, said interference signal removing system comprising:

an interference signal estimating means for estimating the interference signal contained in the received signal based on the received signal and a result obtained by removing the interference signal from the received signal;

an interference signal removing means for removing from the received signal the interference signal estimated by said interference signal estimating means; and an interference signal estimation controlling means for storing the interference signal estimation result of the interference signal estimating means in memory and controlling the interference signal estimation by the interference signal estimating means so as to estimate the interference signal contained in the received signal based on the past interference signal estimation result stored in memory, wherein said interference signal estimating means estimates the interference signal contained in the received signal by sequentially updating a control coefficient for extracting the interference signal from the received signal based on the received signal and a result obtained by removing the interference signal from the received signal;

wherein said interference signal removing means has an interference signal extracting means that extracts the interference signal from the received signal using the control coefficient sequentially updated by the interference signal estimating means, and removes the interference signal extracted by said interference signal extracting means from the received signal; and wherein said interference signal estimation controlling means stores the sequentially updated control coefficient result value as an interference signal estimation result of said interference signal estimating means and controls the interference signal estimation by said interference signal estimating means so as to sequentially update the control coefficient for extracting the interference signal from the received signal using a past sequentially updated control coefficient result value stored in memory as an initial value.

2. An interference signal removal system according to claim 1, wherein said interference signal estimation controlling means has a memory for storing the interference signal estimation result of said interference signal estimating means and a timing controlling means for controlling the timing of storing interference signal estimation results of said interference signal estimating means in the memory and the timing of outputting past interference signal estimation results stored in the memory to said interference signal estimating means.

3. An interference signal removal system according to claim 1, wherein the interference signal that appears repeatedly with passage of time is an interference signal that appears periodically; and wherein said interference signal estimation controlling means updates the stored interference signal estimation result of said interference signal estimating means during the period concerned and controls said interference signal estimation of the interference signal estimating means so as to estimate the interference signal contained in the received signal based on the interference signal estimation result in one period earlier stored in memory.

4. An interference signal removal system according to claim 2, wherein the interference signal that appears repeatedly with passage of time is an interference signal that appears periodically; and wherein said interference signal estimation controlling means updates the stored interference signal estimation result of said interference signal estimating means during the period concerned and controls the interference signal estimation of said interference signal estimating means so as to estimate the interference signal contained in the received signal based on the interference signal estimation result in one period earlier stored in memory.

5. An interference signal removal system according to claim 3, wherein said interference signal estimation controlling means stores the interference signal estimation result of said interference signal estimating means in the memory once every prescribed unit time period and controls the interference signal estimation by said interference signal estimating means so as to estimate the interference signal contained in the received signal based on the interference signal estimation result for one cycle earlier stored in memory every prescribed unit time period.

6. An interference signal removal system according to claim 4, wherein said interference signal estimation controlling means stores the interference signal estimation result of said interference signal estimating means in the memory once every prescribed unit time period and controls the interference signal estimation by said interference signal estimating means so as to estimate the interference signal contained in the received signal based on the interference signal estimation result for one cycle earlier stored in memory every prescribed unit time period.

7. An interference signal removal system according to claim 3, wherein said interference signal estimation controlling means uses a period based on power variation of the received signal as the interference signal period.

8. An interference signal removal system according to claim 4, wherein said interference signal estimation controlling means uses a period based on power variation of the received signal as the interference signal period.

9. An interference signal removal system according to claim 3, wherein said interference signal estimation controlling means uses a period based on power variation of a signal of a prescribed frequency contained in the received signal as the period of the interference signal.

10. An interference signal removal system according to claim 4, wherein said interference signal estimation controlling means uses a period based on power variation of a signal of a prescribed frequency contained in the received signal as the period of the interference signal.

11. An interference signal removal system for removing from a received signal an interference signal that appears repeatedly with a passage of time, which system is characterized in that it estimates the interference signal contained in the received signal based on a past interference signal estimation result and removes the estimated interference signal from the received signal, said interference signal removing system comprising:

an interference signal estimator operable to estimate the interference signal contained in the received signal based on the received signal and a result obtained by removing the interference signal from the received signal;

an interference signal remover operable to remove from the received signal the interference signal estimated by said interference signal estimator; and an interference signal estimation controller operable to store the interference signal estimation result of the interference signal estimator in memory and control the interference signal estimation by the interference signal estimator so as to estimate the interference signal contained in the received signal based on the past interference signal estimation result stored in memory, wherein said interference signal estimator estimates the interference signal contained in the received signal by sequentially updating a control coefficient for extracting the interference signal from the received signal based on the received signal and a result obtained by removing the interference signal from the received signal;

wherein said interference signal remover has an interference signal extractor that extracts the interference signal from the received signal using the control coefficient sequentially updated by the interference signal estimator, and removes the interference signal extracted by said interference signal extractor from the received signal; and wherein said interference signal estimation controller stores the sequentially updated control coefficient result value as an interference signal estimation result of said interference signal estimator and controls the interference signal estimation by said interference signal estimator so as to sequentially update the control coefficient for extracting the interference signal from the received signal using a past sequentially updated control coefficient result value stored in memory as an initial value.

12. An interference signal removal system according to claim 11, wherein said interference signal estimation controller has a memory for storing the interference signal estimation result of said interference signal estimator and a timing controller operable to control the timing of storing interference signal estimation results of said interference signal estimator in the memory and the timing of outputting past interference signal estimation results stored in the memory to said interference signal estimator.

13. An interference signal removal system according to claim 11, wherein the interference signal that appears repeatedly with passage of time is an interference signal that appears periodically; and wherein said interference signal estimation controller updates the stored interference signal estimation result of said interference signal estimator during the period concerned and controls said interference signal estimation of the interference signal estimator so as to estimate the interference signal contained in the received signal based on the interference signal estimation result in one period earlier stored in memory.

14. An interference signal removal system according to claim 12, wherein the interference signal that appears repeatedly with passage of time is an interference signal that appears periodically; and wherein said interference signal estimation controller updates the stored interference signal estimation result of said interference signal estimator during the period concerned and controls the interference signal estimation of said interference signal estimator so as to estimate the interference signal contained in the received signal based on the interference signal estimation result in one period earlier stored in memory.

15. An interference signal removal system according to claim 13, wherein said interference signal estimation controller stores the interference signal estimation result of the interference signal estimator in the memory once every prescribed unit time period and controls the interference signal estimation by the interference signal estimator so as to estimate the interference signal contained in the received signal based on the interference signal estimation result for one cycle earlier stored in memory every prescribed unit time period.

16. An interference signal removal system according to claim 14, wherein said interference signal estimation controller stores the interference signal estimation result of said interference signal estimator in the memory once every prescribed unit time period and controls the interference signal estimation by said interference signal estimator so as to estimate the interference signal contained in the received signal based on the interference signal estimation result for one cycle earlier stored in memory every prescribed unit time period.

17. An interference signal removal system according to claim 13, wherein said interference signal estimation controller uses a period based on power variation of the received signal as the interference signal period.

18. An interference signal removal system according to claim 14, wherein said interference signal estimation controller uses a period based on power variation of the received signal as the interference signal period.

19. An interference signal removal system according to claim 13, wherein said interference signal estimation controller uses a period based on power variation of a signal of a prescribed frequency contained in the received signal as the period of the interference signal.

20. An interference signal removal system according to claim 14, wherein said interference signal estimation controller uses a period based on power variation of a signal of a prescribed frequency contained in the received signal as the period of the interference signal.

* * * * *